US009077753B2

(12) United States Patent
Kafle et al.

(10) Patent No.: US 9,077,753 B2
(45) Date of Patent: Jul. 7, 2015

(54) METHOD FOR SECURING NAME REGISTRIES, NETWORK ACCESS AND DATA COMMUNICATION IN ID/LOCATOR SPLIT-BASE NETWORKS

(75) Inventors: Ved Kafle, Tokyo (JP); Tomoji Tomuro, Tokyo (JP); Hiroaki Harai, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 14/364,356

(22) PCT Filed: Jan. 26, 2012

(86) PCT No.: PCT/JP2012/000505
§ 371 (c)(1),
(2), (4) Date: Jun. 11, 2014

(87) PCT Pub. No.: WO2013/111192
PCT Pub. Date: Aug. 1, 2013

(65) Prior Publication Data
US 2014/0304785 A1    Oct. 9, 2014

(51) Int. Cl.
*H04L 29/06* (2006.01)
*H04L 29/12* (2006.01)
*H04W 8/12* (2009.01)

(52) U.S. Cl.
CPC ............... *H04L 63/164* (2013.01); *H04W 8/12* (2013.01); *H04L 63/12* (2013.01); *H04L 63/20* (2013.01); *H04L 61/103* (2013.01); *H04L 61/1511* (2013.01); *H04L 61/3015* (2013.01); *H04L 61/2084* (2013.01)

(58) Field of Classification Search
CPC ....... H04L 63/08; H04L 63/083; H04L 63/01; H04L 63/164; H04L 63/20; H04L 63/12; H04W 12/06
See application file for complete search history.

(56) References Cited

U.S. PATENT DOCUMENTS

| 7,853,788 | B2 * | 12/2010 | Fascenda ........................ 713/168 |
| 8,503,427 | B2 * | 8/2013 | Norefors et al. ............... 370/351 |
| 8,887,307 | B2 * | 11/2014 | Chen ............................... 726/29 |

(Continued)

FOREIGN PATENT DOCUMENTS

JP    2008-312191    12/2008

OTHER PUBLICATIONS

D. Farinacci, V. Fuller, D. Meyer, and D. Lewis, "Locator/ID separation protocol (LISP)," Internet-Draft, http://www.ietf.org/id/draft-ietf-lisp-16.txt, Oct. 2011.*
V.P. Kafle, H. Otsuki, and M. Inoue, "An ID/locator split architecture for future networks," IEEE Commun. Mag., vol. 48, No. 2, Feb. 2010.*
ITU-T Recommendation Y.2015, "General requirements of ID/locator separation in NGN," 2009.*

(Continued)

*Primary Examiner* — Yonas Bayou
(74) *Attorney, Agent, or Firm* — Greenblum & Bernstein, P.L.C.

(57) ABSTRACT

The invention provides a new system for internet security. The internet network system comprises a first Edge Network 11 that comprises a Source Host (SH) 12, a first gateway (GW) 13 and a Local Name Server (LNS) 14, a Logical Control network 21 which comprises a Domain Name Registry (DNR) 22 and a Host Name Registry (HNR) 23, a Target Host (TH) 31 in the first Edge Network 11 or in a second Edge Network 32 and a Global Transit Network 41 which includes Routers 42 to connect the first Edge Network 11, the Logical Control network 21; and the second Edge Network 32.

4 Claims, 16 Drawing Sheets

(56) References Cited

U.S. PATENT DOCUMENTS

| | | | |
|---|---|---|---|
| 8,935,748 B2* | 1/2015 | Statia et al. | 726/3 |
| 8,949,954 B2* | 2/2015 | Etchegoyen | 726/5 |
| 8,990,349 B2* | 3/2015 | Bauer et al. | 709/219 |
| 2003/0070067 A1* | 4/2003 | Saito | 713/150 |
| 2008/0164997 A1* | 7/2008 | Aritsuka et al. | 340/539.13 |
| 2008/0313691 A1* | 12/2008 | Cholas et al. | 725/131 |
| 2009/0216720 A1* | 8/2009 | Piche et al. | 707/3 |
| 2010/0208742 A1* | 8/2010 | Kafle et al. | 370/401 |
| 2012/0203856 A1* | 8/2012 | Wu et al. | 709/206 |
| 2013/0262672 A1* | 10/2013 | Sun | 709/224 |

OTHER PUBLICATIONS

Kanemaru et al., "ZNP: A Network Layer Protocol Based on ID/Locator Split Considering Practical Operation", Proceedings of 2011 IEEE International Conference on Communications (ICC), Jun. 5, 2011, pp. 1-6.

Pan et al., "MILSA: A Mobility and Multihoming Supporting Identifier Locator Split Architecture for Naming in the Next Generation Internet", Proceedings of 2008 IEEE Global Telecommunications Conference, Nov. 30, 2008, pp. 1-6.

* cited by examiner

METHOD FOR SECURING NAME REGISTRIES, NETWORK ACCESS AND DATA COMMUNICATION IN ID/LOCATOR SPLIT-BASE NETWORKS

TECHNICAL FIELD

This invention makes new generation network, which is based on the concept of ID/locator split, secure. It specifies security methods for (a) name registries that store a host's hostname, host ID, locator, security keys, and other parameters, (b) network access, and (c) host-to-host communication.

BACKGROUND ART

The following existing technologies that have been used to make the Internet services secured are related with this invention.

DNSSEC (Domain Name System Security Extensions) is used to securely store domain names, IP addresses and other parameters in the global system of DNS servers ([DNSSEC]). And by using a hierarchical trust model, DNSSEC provides assurance that the DNS records can be transmitted securely from the server to a requesting host. It protects the integrity of DNS records, that is, these records cannot be modified by an eavesdropper when they are being transmitted through the network.

IPsec (Internet Protocol Security) is a security mechanism for securing IP layer connections in the current Internet ([IPsec]). IPsec protects the integrity of both the IP header and payload in data packets, i.e. the receiver of the packets can verify that these packets have not been modified by an eavesdropper.

However, IPsec is not properly applicable to the ID/locator split-based new generation network because this network requires changing IP headers as packets traverse the different parts of the heterogeneous network that can use different types of network layer protocols.

JP Patent Publication 2008-312191 A specifies the basic conceptual architecture of the ID/locator split-based new generation network architecture. It describes the functions of different components, such as the gateway, host (or node) and name servers, and their interactions.

JP Patent Publication 2008-312191 A describes the method to form node names or hostnames and IDs, the protocol stack of ID/locator split network architecture, the ID/locator split-based communication initialization process, and ID/locator split supporting hierarchical network structure.

To eliminate the problems caused by the overloaded semantics of IP addresses as both host IDs and locators, various approaches of introducing the ID/locator split concept into network architectures have recently been discussed. ID/locator split architectures use distinct sets of values for host IDs and locators, whose mappings are stored in some mapping servers. Locator/ID Separation Protocol (LISP) [LISP] is introducing ID/locator split in the edge routers to reduce BGP routing table growth rates and route update frequencies in the backbone networks. Host Identity Protocol (HIP) [HIP] applies ID/locator split in the host protocol stack to make the session establishment and mobility functions secured. Similarly, Shim6 [Shim6] applies ID/locator split to enable hosts to support multihoming. While each of the above protocols tries to address a specific issue (viz. routing scalability, secured mobility, and multihoming) of the current Internet, HIMALIS (Heterogeneity Inclusion and Mobility Adaptation through Locator ID Separation) [HIMALIS] proposes a generic architecture, based on the ID/locator split concept, that can better support mobility, multihoming, scalable routing and heterogeneous protocols in the network layer. These proposals require retrieving ID/locator mapping data to find corresponding locators for the given names or IDs when forwarding packets into the network. They need to update the mapping data when hosts change their locators (due to mobility) or add new locators (due to multi homing). The Domain Name System (DNS) is not suitable for the fast updates of this type of dynamic mapping data because of the existence of multiple copies of cached data in the global system of DNS servers [DNS2].

Therefore, besides DNS servers, additional servers are needed for storing the ID/locator mapping data of dynamic hosts. For this purpose, ALT [ALT] for LISP, rendezvous servers for HIP, and hostname registries for HIMALIS, for instance, have been proposed in the literature. These proposals, however, lack inbuilt security functions for collectively protecting the update and retrieval procedures. This patent application specifies a method to make the system secured.

Although HIP uses certificates and public keys to establish secure sessions between hosts, it does not cover the security of ID/locator mapping update, retrieval and network access process. DNS security [DNSSEC] uses certificates and public keys to securely distribute and retrieve domain records, but it is not favorable for frequent updates of the records.

SUMMARY OF INVENTION

Technical Problem

As mentioned earlier, DNSSEC [DNSSEC] is used to securely store the records of domain names, IP addresses and other parameters in the global system of DNS servers. However, DNS is not suitable for frequently updating the records to support mobile devices.

Similarly, IPsec is not properly applicable to the ID/locator split-based new generation network because this network requires changing IP headers as packets traverse the different parts of the heterogeneous network that can use different types of network layer protocols. Therefore, in the new generation network, the payload or data packets should be protected by new functions implemented in the ID layer. In other words, the ID layer should have functions to protect packets by negotiating security parameters and using ID header in packets to carry the authentication data or integrity check value computed by using the pre-negotiated security parameters. The receiver of the packet checks the integrity check value contained in the ID header to verify that the packet has not been modified on the network. Therefore, for this purpose we have invented an IDsec mechanism.

Solution to Problem

The drawbacks described above are solved by the invention claimed.

The first aspect of the invention relates to a method for a hostname resolution in an internet network system 1. The system comprises:

a first Edge Network 11 that comprises a Source Host (SH) 12, a first gateway (GW) 13 and a Local Name Server (LNS) 14;

a Logical Control network 21 which comprises a Domain Name Registry (DNR) 22 and a Host Name Registry (HNR) 23;

a Target Host (TH) 31 in the first Edge Network 11 or in a second Edge Network 32; and a Global Transit Network 41 which includes Routers 42 to connect the first Edge Network 11, the Logical Control network 21; and the second Edge Network 32.

The hostname resolution method comprises following steps.

The SH 12, which knows a hostname of the TH 31, sends a hostname resolution query, which includes the hostname of the TH 31, to the LNS 14 so as to obtain one or more of the TH's ID, the TH's locator and the TH's Public Key (PK).

The LNS 14 receives the hostname resolution query and checks whether the TH 31 is in the first Edge Network 11 or not.

When the LNS 14 cannot decide that the TH 31 is located in the first Edge Network 11, the LNS 14 sends a first query, which includes the hostname of the TH 31, to the DNR 22.

The DNR 22 receives the first query and then the DNR 22 sends a first reply to the LNS 14, wherein the first reply contains the HNR's information including the HNR's ID, the HNR's locator, and the HNR's PK. The reply may also include DNR's certificate chain from the root DNR, DNR's PK, and DNR's Signature created by using the DNR's private key.

The LNS 14 receives the first reply and then the LNS 14 sends a second query to the HNR 23 using the HNR's information. The second query requests the HNR 23 to provide LNS 14 with the TH's ID, the TH's locator and the TH's PK.

The HNR 23 receives the second query and then the HNR 23 sends a second reply to the LNS 14. The second reply contains the TH's ID, the TH's locator and the TH's PK. It may also include the HNR's Signature created by using the HNR's private key.

The LNS 14 receives the second reply and executes a function to verify the authenticity of the second reply message by using the HNR's PK. In verification it is preferred to use DNR certificate chain as well as the HNR's PK.

When the result of the verification is OK, the LNS 14 sends a hostname resolution response to the SH 12. The response includes the TH's ID, the TH's locator and the TH's PK.

The SH 12 receives the TH's ID, the TH's locator and the TH's PK in the hostname resolution response.

A preferred embodiment of the first aspect is the HNR's information comprises the HNR's ID and the HNR's locator. The HNR's information may further comprise the HNR's PK. The first reply further comprises the DNR's PK, and the DNR's Signature using the DNR's private key, and the DNR's PK and the DNR's Signature are used in verifying the first reply from the DNR. The HNR's PK is used to verify the second reply from the HNR 23.

Another preferred embodiment of the first aspect is that the first Edge Network 11 further comprises an authentication agent (AA) 15 and a Dynamic Host Configuration Protocol Server (DHCP) 16.

The first gateway (GW) 13, the LNS 14 and the AA 15 has pair-wise shared keys AA-GWshKey, AA-LNSshKey and LNS-GWshKey that are used to protect messages to be exchanged between them.

The method may further comprise, before the SH 12 sends a hostname resolution query, an initial configuration step (S201) for obtaining the SH's own LLoc and the first GW's ID and LLoc, the LNS's ID and LLoc and the AA's ID and LLoc from the DHCP, an authentication step (S202) for authenticating the SH in the first Edge Network, a local registration step (S203) for making the SH's hostname, ID, PK and LLoc registered in the first GW 13 and in the LNS 14, and an HNR update step (S204) for updating the SH's locator in the HNR.

The authentication step (S202) is a step which occurs after the initial configuration step (S201). In this step, the SH 12 sends a first host registration request to the AA 15, wherein the first host registration request includes the SH's hostname, the SH's ID, the SH's PK and a list of integrity-check-algorithm supported by the SH 12.

The AA 15 receives the first host registration request and after that the AA performs the hostname resolution in accordance with claim 1 to get the SH's ID and PK from the HNR as well.

The AA 15 verifies that the host information sent by the SH and that obtained from the HNR are the same.

The AA 15 selects an integrity-check-algorithm based on the type of integrity-check-algorithm the AA can support.

The AA 15 assigns an Access ID and a secret Access Key.

The AA 15 sends a first host registration reply, which includes the integrity-check-algorithm, the Access ID and the secret Access Key, to the SH 12, wherein the Access ID and the secret Access Key are encrypted by the SH's PK.

The SH 12 receives the first host registration reply.

The local registration step (S203) is a step which is after the authentication step (S202). In this step, the SH 12 sends a second host registration request, which includes the SH's hostname, the SH's ID, the SH's LLoc, the SH's PK, which is integrity protected by including an HMAC computed by using the Access Key in the integrity-check-algorithm, to the AA 15. The AA 15 receives the second host registration request. The AA 15 sends a host registration message for GW, which includes the SH's hostname, the SH's ID, the SH's LLoc, the SH's PK and Access Key encrypted by AA-GWshKey, to the first GW 13 and the AA 15 sends a host registration message for LNS, which includes the SH's hostname, the SH's ID, the SH's LLoc, the SH's PK and Access Key encrypted by AA-LNSshKey, to the LNS 14.

The first GW 13 receives and decrypts the host registration message for GW using AA-GWshKey, the first GW 13 assigns a GLoc to the SH 12 and stores the SH's GLoc in the memory of the first GW 13. The first GW 13 sends a host registration response message from GW, which includes the SH's GLoc, to the AA 15. The LNS 14 receives and reads the host registration message for LNS using AA-LNSshKey and the LNS 14 stores the SH's hostname, the SH's ID, the SH's LLoc, the SH's PK and Access Key. The LNS 14 sends a host registration response message from LNS to the AA 15. The AA 15 sends a second host registration reply, which comprises the SH's GLoc, to the SH 12. The SH 12 receives the second host registration reply.

The HNR update step (S204) is executed after the local registration step (S203). In this step, the SH 12 sends a third host registration request, which includes the SH's hostname, the SH's ID and the SH's GLoc and encrypted by SH-HNRshKey, to the HNR 23. The HNR 23 receives and reads the third host registration request using the SH-HNRshKey. The HNR 23 updates the SH's GLoc in the HNR's record and sends a third host registration response to the SH 12.

Another preferred embodiment of the first aspect is that the method further comprises a procedure for establishing a communication session between two hosts, say the SH 12 and the TH 31.

The SH 12 sends a first communication init request message, containing the SH and TH's IDs, SH's hostname, PK and GLoc, TH's GLoc, list of integrity-check-algorithms, and SH's signature to the TH 31 so as to tell a communication request to the TH 31. The word "init" means initialization.

The TH 31 receives the first communication init request message and stores, in a temporary buffer of the TH 31, the SH's ID, GLoc, PK and LLoc and the selected integrity-check-algorithm.

The TH 31 verifies the authenticity of the SH by retrieving the SH's ID and PK from the HNR by performing a hostname resolution process in accordance with the above method.

The TH 31 sends a first communication init response that includes the TH's GLocs when the TH 31 has two or more GLocs, to the SH 12, the first communication init response being protected by TH's signature using its private key.

The SH 12 receives the first communication init response and generates a secret session key (sessKey) which is used to protect the integrity of packets exchanged between the SH and the TH, a lifetime being associated with the sessKey.

The SH 12 stores the TH's ID, PK, sessKey and lifetime in a temporary buffer of the SH. The SH 12 sends a second communication init response, which includes the sessKey encrypted by the TH's PK, and the message signed by the SH's private key, to the TH 31. The TH 31 receives the second communication init response and copies the temporary buffer (containing the SH's ID, GLoc, PK and LLoc) and the sessKey to the security association table (SAT) of TH 31.

The TH 31 sends a communication init complete message, which is protected by an HMAC computed using the sessKey, to the SH 12.

The SH 12 receives and checks the communication init complete message to confirm whether the TH 31 has accepted the connection request or not. The SH 12 copies the temporary buffer that contains the SH's ID, GLoc, PK and LLoc to the SAT of the SH 12. The SH 12 starts sending or receiving data to or from the TH 31.

Advantageous Effects of Invention

This invention specifies methods for mainly securing the following three functions of the new generation network: (1) name registries functions, (2) network access functions, and (3) session establishment and data packet communication functions.

To secure name registries, this invention specifies a security method for storing and updating hostname, host ID, locator, security keys (such as public key or PK) and other parameters in the domain name registry (DNR) and host name registry (HNR) as DNR and HNR records, respectively. It also specifies a security method for hostname resolution which is used to retrieve or obtain host ID, locator, PK and other parameters corresponding to the hostname from these name registries. For securing the process of storing, updating and retrieving the DNR records, this invention extends the concept of DNSSEC [DNSSEC]; while for securing the process of storing, updating and retrieving the HNR records, this invention creates new methods.

To secure network access process, this invention specifies a method for securely connecting hosts (i.e. devices) to the network. It includes security functions to authenticate the host, securely assign locators and shared keys to the host, and securely register host-related information (such as hostname, ID, locator, security keys) in the access network entities: gateway, name server, and authentication agent. To authenticate the host, the authentication agent uses HNR records to verify that the host actually possesses the hostname, host ID and public key as claimed by the host.

To secure a communication session between two hosts, this invention specifies a method for exchanging signaling messages from the identity layer of the protocol stack. Through these signaling messages, the hosts negotiate security parameters and store them in a security association database. They use the security association to compute authentication data or an integrity check value (ICV), which is sent in the ID header of the packet. The receiver verifies the ICV using the security association and assures itself that the data packet has been sent by the authenticated host and that the data packet has not been modified while it was being transmitted through the network.

The effect of this invention is that it makes the ID/locator-based new generation network secured so that users can freely use the network services.

DESCRIPTION OF EMBODIMENTS

Figure 1:
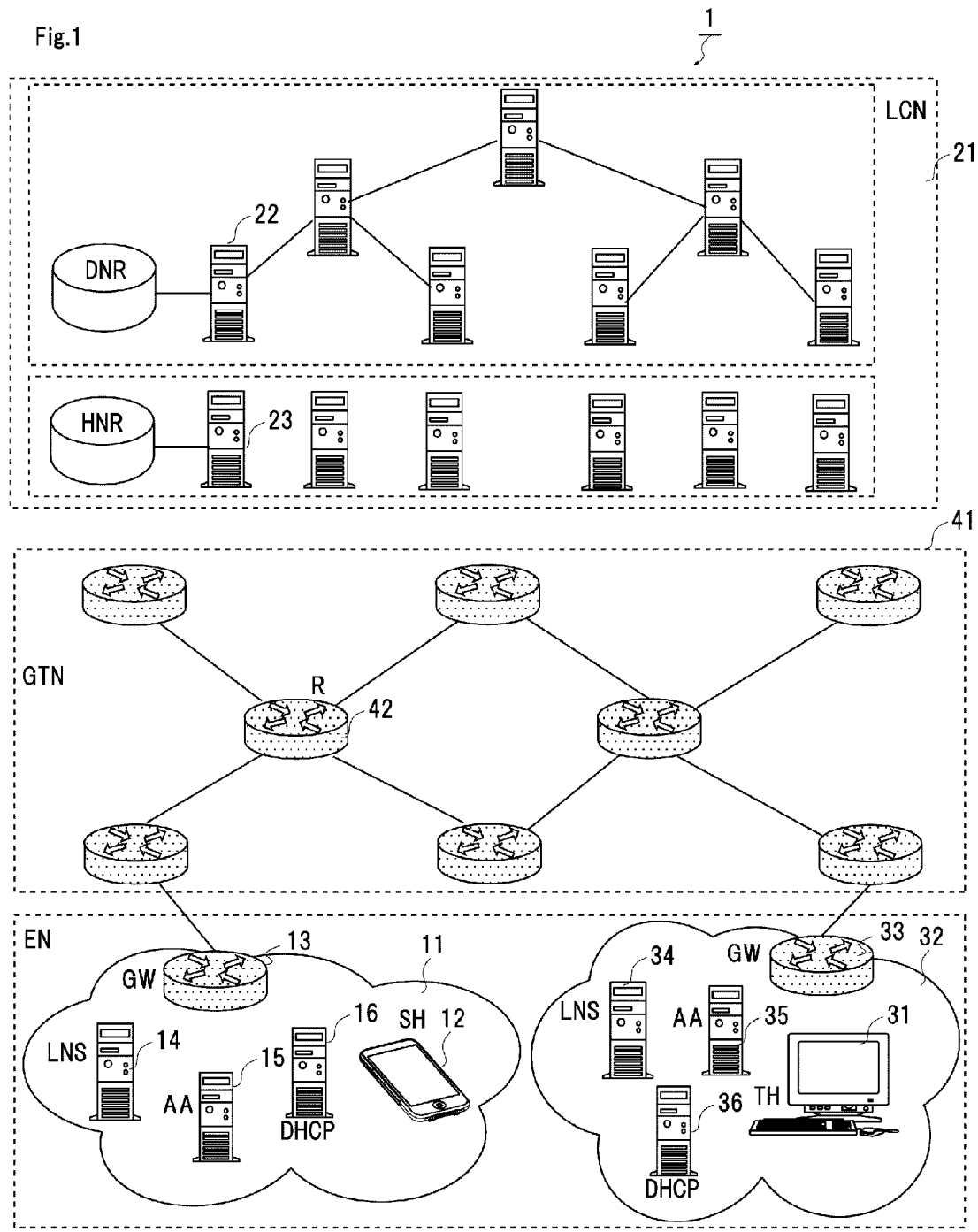
FIG. 1 shows the network architectural components of the invention.

FIG. 1 shows the network architectural components used to explain the security methods of the invention. As shown in FIG. 1, the internet network system 1 of the invention has a first Edge Network 11, a Logical Control Network 21, a Target Host (TH) 31 in a second Edge Network 32, and a Global Transit Network 41.

The first Edge Network 11 has a Source Host (SH) 12, a first gateway (GW) 13 and a Local Name Server (LNS) 14. The first Edge Network 11 may further have an authentication agent (AA) 15.

The Logical Control network 21 has a domain name registry (DNR) 22 and a Host Name Registry (HNR) 23.

In FIG. 1, the TH 31 is in the second Edge Network 32. The TH may be located in the first Edge Network 11. The second Edge Network 32 has similar structure to the first Edge Network 11. The second Edge Network 32 has a second gateway (GW) 33 and a second Local Name Server (LNS) 34. The second Edge Network 32 may further have an authentication agent (AA) 35.

Global Transit Network 41 has a plurality of Routers 42 to connect the first Edge Network 11, the Logical Control Network 21, and the TH 31. The Global Transit Network forwards packets from one edge network to another based on the global locators (Glocs) present in the packet header. Similarly, the edge networks use local locators (Llocs) to forward packets within the edge network. When a packet flows from the edge network into the global network, the LLocs in the packet header are replaced by corresponding GLocs. When a device or host connects to the edge network, it obtains both of its LLoc and GLoc. The host uses the LLoc in the header of packets it creates and injects into the network. Similarly, it receives the packets that contain its LLoc in the destination locator field of the header. The host uses the GLoc in some signaling message such as in the communication initialization or mobility signaling.

Hostname Resolution

Figure 2:
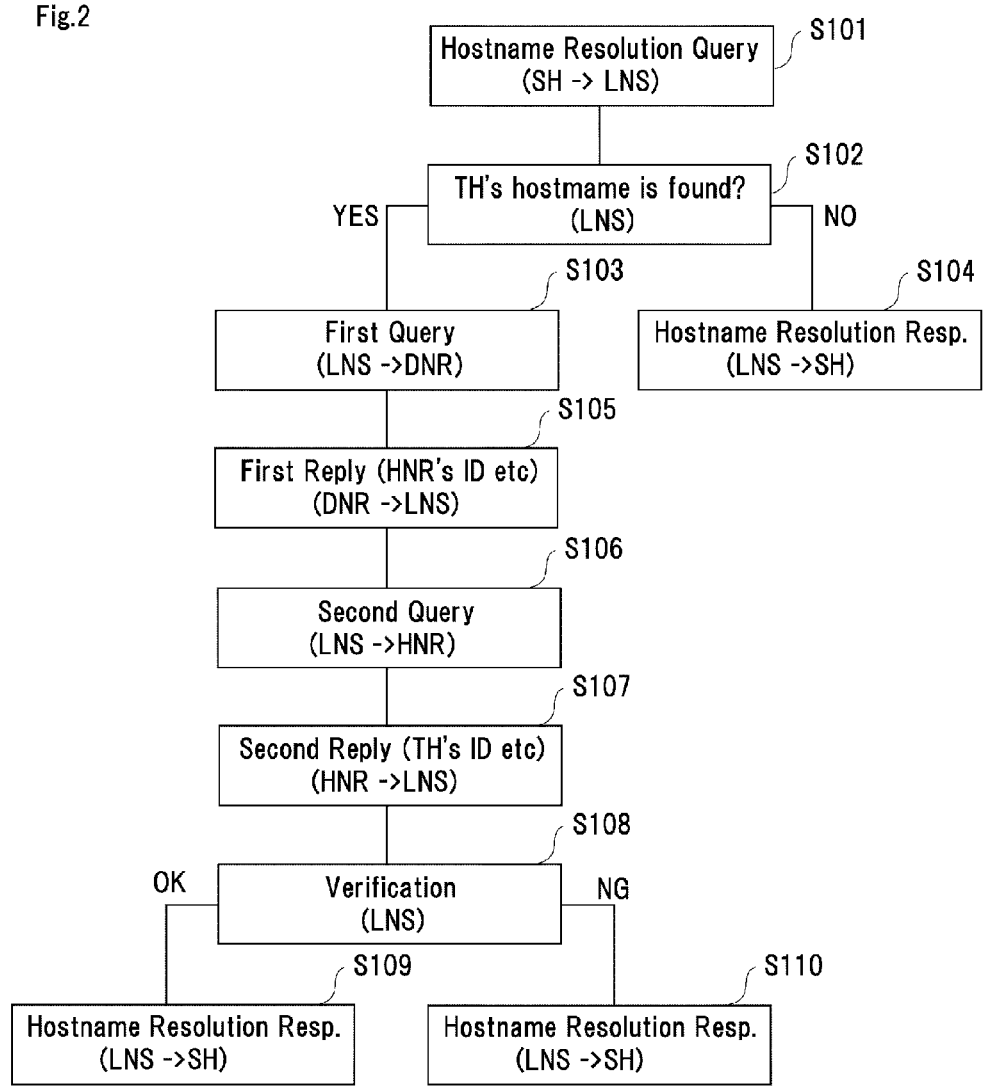
FIG. 2 is a flow chart for a hostname resolution procedure.

FIG. 2 shows a flow chart for a hostname resolution procedure. A method for a hostname resolution is procedure to obtain ID, Locator, Public Key (PK) of a target host when searched by the target host's hostname. In the FIG. 2, S stands for Step. As shown in FIG. 2, the SH 12 sends a hostname resolution query to the LNS 14 (Step 101) so as to obtain one or more of the TH's ID, the TH's locator and the TH's PK. The SH 12 initially knows a hostname of the TH 31 but does not know all of the necessary information to communicate with the TH 31. The hostname resolution request is integrity protected by an HMAC (Hash-based message authentication code) computed using an access key that the host shares with the LNS.

The LNS 14 receives the hostname resolution query from the SH 12. The LNS 14 and the SH 12 are in the same Edge Network, the first Edge Network 11. The LNS 14 checks its memory to find whether the TH 31 is in the first Edge Network or not (S102). If the TH's was in the first Edge Network, its information, which includes the TH's hostname, ID, locator and PK, would have been stored in the memory of the LNS 14 and the TH's ID and locator have been stored in the GW 13.

When the LNS 14 cannot decide that the TH 31 is located in the first Edge Network 11, the LNS 14 sends a first query to the DNR 22 (Step 103). The first query contains the hostname of the TH. The first query requests the DNR 22 to provide the LNS 14 with the first reply that contains the HNR's ID, GLoc, and PK.

When the LNS 14 can decide that the TH 31 is located in the first edge network 11, the LNS 14 sends a hostname resolution response to the SH 12 (Step 104). When the TH 31 is located in the first edge network 11, the first edge network 11 has the TH's information that includes the TH's ID, the TH's locator and the TH's Public Key (PK). The information may be stored at a memory, a table or a database of the first GW 13. After the LNS 14 obtains the TH's information, the LNS 14 sends the hostname resolution response which has the TH's information to the SH 12.

When the DNR 22 receives the first query, the DNR 22 sends a first reply to the LNS 14 (Step 105). The first reply contains the HNR's information that includes the HNR's ID, GLoc, and PK. The first reply may further contain the DNR's Public Key, the DNR's certificate chain from the root DNR (not shown in the figure) and the DNR's Signature created by using the DNR's Private Key. The DNR's Public Key, DNR certificate chain and the DNR's Signature are used by the LNS to verify the authenticity of the reply sent by the DNR.

The LNS 14 receives the first reply issued by the DNR 22 in the Step 105. The first reply includes the HNR's information such as the HNR's ID and the HNR's locators, and the HNR's PK. The LNS 14 verifies the DNR's signature by using the DNR's Public Key and certificate. Hence, it verifies the authenticity of the HNR's information received from the DNR in the first reply. The LNS stores (or caches) the HNR's information in its buffer memory for sometime.

Then the LNS 14 sends a second query to the HNR 23 using the HNR's information (Step 106). The second query requests the HNR 23 to provide LNS 14 with the TH's ID, the TH's locator and the TH's PK.

The HNR 23 receives the second query issued by the LNS 14. Then the HNR 23 obtains the TH's ID, the TH's locator and the TH's PK from a memory in the HNR 23. For example, the second query has the TH's hostname and the HNR 23 can obtain the TH's ID, the TH's locator and the TH's PK by searching the TH's hostname in the HNR's memory. The HNR 23 sends a second reply to the LNS 14 (Step 107). The second reply contains the TH's ID, the TH's locator and the TH's PK. The second reply message also includes the HNR's Signature to protect the message integrity. Note that the TH's locator stored in the HNR is the TH's GLoc.

The LNS 14 receives the second reply. The second reply contains the TH's ID, the TH's locator and the TH's PK, and HNR's signature. Then the LNS 14 verifies the HNR signature using the HNR's public key received in the first reply from the DNR.

When the result of the verification is OK, the LNS 14 sends a hostname resolution response, which includes the TH's ID, the TH's locator and the TH's PK, to the SH (Step 109). The hostname resolution response is protected by an HMAC which is created by using the secret Access Key, which is shared between the LNS 14 and the SH 12.

When the result of the verification is "could not be verified" or NG, the LNS 14 sends a hostname resolution response to the SH 12 (Step 110). The hostname resolution response may include a refusal.

Network Access

Figure 3:
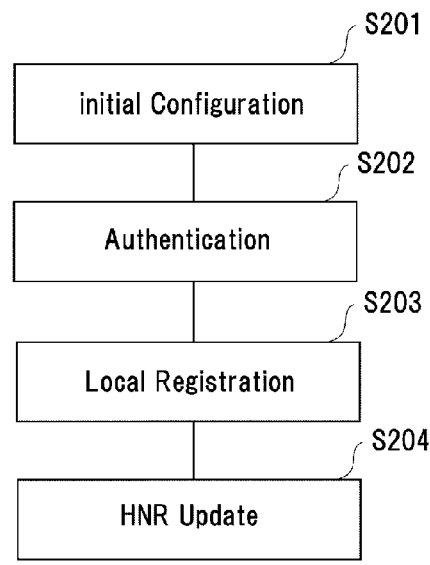
FIG. 3 is a flow chart for a network access procedure.

FIG. 3 shows a flow chart for a network access procedure. The network access procedure includes the authentication of the host by the network before the host (e.g., SH) is allowed to communicate with other hosts. The network access procedure also creates a security context (consisting of access IDs and access keys) in the host and the network which is used for protecting messages exchanged between the host and the network.

The first Edge Network 11 comprises an Authentication Agent (AA) 15 and a Dynamic Host Configuration Protocol Server (DHCP) 16. Dynamic Host Configuration Protocol is a communications protocol that lets network administrators centrally manage and automate the assignment of Internet Protocol (IP) addresses in an organization's network. Using the Internet Protocol, each machine that can connect to the Internet needs a unique IP address, which is assigned when an Internet connection is created for a specific computer.

The first gateway (GW) 13, the LNS 14 and the AA 15 have shared keys AA-GWshKey, AA-LNSshKey and LNS-GWshKey that are used to protect messages to be exchanged among them.

The network access procedure comprises an initial configuration step (Step 201) for obtaining the SH's local locator (LLoc) and global locator (GLoc) and the first GW's ID and LLoc, the LNS's ID and LLoc and the AA's ID and LLoc from the DHCP, an authentication step (Step 202) for authenticating the SH, a local registration step (Step 203) for making the SH's hostname, ID, PK and LLoc registered in the first GW 13 and in the LNS 14, and an HNR update step (Step 204) for updating the SH's ID/locator mapping in the HNR.

The initial configuration step (Step 201) occurs when one host, which will be the SH or the TH, detects that an Edge Network is available. In the following explanation the host is explained using the SH. The SH recognizes the existence of the Edge Network (say, by detecting radio spectrum or wired connection) and sends a DHCP Discovery message to join in the Edge Network 11, to the DHCP 16. The DHCP 16 receives the DHCP Discovery message and issues a DHCP Offer message, which includes parameters such as the SH's LLoc and the first GW 13's ID and LLoc, the LNS 14's ID and LLoc and the AA 15's ID and LLoc. The SH 12 stores these parameters in its configuration file and issues a DHCP Request-containing these parameters to the DHCP 16. The DHCP 16 receives the DHCP request and issues back a DHCP ACK, which is an acknowledgement to the SH 12.

The authentication step (Step 202) is a step for authenticating the SH 12 after the initial configuration step (Step 201).

The SH 12 sends a first host registration request to the AA 15. The first host registration request includes the SH's hostname, the SH's ID, the SH's PK and a type of integrity-check-algorithm. The type of integrity-check-algorithm is that the SH wants to use in computing an HMAC for protecting messages exchanged with the AA 15, GW 13 and LNS 14.

The AA 15 receives the first host registration request. The AA verifies the SH's identity (i.e. hostname, ID, and PK) by getting the SH's records from the HNR 23. The process for getting the SH's records from the HNR 23 is as shown in FIG. 2. The AA 15 selects an integrity-check-algorithm based on the type of integrity-check-algorithm the network can support. An example of the integrity-check algorithm is HMAC-SHA1. The AA 15 assigns an Access ID, which is identification used for accessing the AA, and a secret Access Key. The secret Access Key is a shared secret key that the host would use for authentication and integrity protection of messages exchanged with the Edge Network entities, such as the AA 15, LNS 14, and GW 13. The Access Key has a definite lifetime. The AA 15 sends a first host registration reply to the SH 12. The reply includes the integrity-check-algorithm, the Access ID and the Access Key. The Access ID and the secret Access Key are encrypted by the SH's PK.

The SH 12 receives the first host registration reply (response). The reply includes the integrity-check-algorithm, the Access ID and the secret Access Key.

The local registration step (Step 203) is a step for making the SH's hostname, ID, PK and LLoc registered in the GW 13 and in the LNS 14. The local registration step (Step 203) is after the authentication step (Step 202). The following is an example of the step.

First, the SH 12 sends a second host registration request to the AA 15. The request includes the SH's hostname, the SH's ID, the SH's LLoc, the SH's PK and Access Key and the request is encrypted by the Access Key. The AA 15 receives the second host registration request. The AA 15 sends a host registration message for GW to the GW 13. The message includes the SH's hostname, the SH's ID, the SH's LLoc, the SH's PK and Access Key encrypted by AA-GWshKey. The AA 15 sends a host registration message for LNS to the LNS 14. The message includes the SH's hostname, the SH's ID, the SH's LLoc, the SH's PK and Access Key encrypted by AA-LNSshKey.

The GW 13 receives and reads the host registration message for GW by decrypting the message by using AA-GWshKey. The GW 13 assigns a GLoc to the SH 12 and stores the SH's ID, LLoc, GLoc, Access ID and Access Key in the memory of the first GW 13. The first GW 13 sends a host registration message from GW to the AA 15. The message, which includes the SH's GLoc, is encrypted by AA-LNSshKey. The AA 15 receives it.

The LNS 14 receives and reads the host registration message for LNS using AA-LNSshKey. The LNS 14 stores the SH's hostname, the SH's tentative ID, the SH's LLoc, the SH's PK and Access ID and Access Key in the memory of the LNS 14. The LNS 14 sends a host registration message from LNS to the AA 15. The AA 15 receives it.

The AA 15 sends a second host registration reply to the SH 12. The reply contains the SH's GLoc.

The HNR update step (Step 204) is a step for updating HNR. The HNR update step (Step 204) is after the local registration step (Step 203). The following is an example of the step.

The SH 12 sends a third host registration request to the HNR 23. The request includes the SH's hostname, the SH's ID and the SH's GLoc and the request is encrypted by SH-HNRshKey. The HNR 23 receives and reads the third host registration request using the SH-HNRshKey. The HNR 23 updates the SH's GLoc in the HNR's record and sends a third host registration response to the SH 12.

Communication Sessions Security Procedure

In the communication session security procedure, the SH 12 and the TH 31 authenticate to each other and protect the integrity of their data by prevent a third party from modifying the data.

The SH 12 sends a first communication init request message to the TH 31. The message contains the SH's and TH's IDs, SH's hostname, PK and GLoc, TH's GLoc, and list of integrity-check-algorithms. The message also includes the SH's Signature created by using its private key.

The TH 31 receives the first communication init request message and stores the SH's ID, GLoc, PK and LLoc and the selected integrity-check-algorithm in a temporary buffer of the TH 31. The TH 31 verifies the authenticity of the SH by retrieving SH's ID and PK from the HNR by performing hostname resolution as explained earlier. The TH 31 compares the SH 12's IDs and PKs provided by the SH and those retrieved from the HNR. If they are the same, the TH 31 authenticates the SH and carries out the following steps. Otherwise, the TH 31 simply ignores the communication init request and deletes the SH's information from the temporary buffer.

The TH 31 sends a first communication init response that includes the TH's GLocs when the TH 31 has two or more GLocs, to the SH 12. When the TH 31 has only one GLoc, the response may not include the TH's GLoc(s). The first communication init response is signed by TH's private key. The SH 12 receives the first communication init response and generates a secret session key (sessKey). The sessKey is used to protect the integrity of packets exchanged between the SH and the TH. That is, each packet includes an HMAC computed using the sessKey. And the receiver of the packet can verify if the packet has been intact (i.e. not modified by any eavesdropper on the way) by computing the HMAC using the sessKey and comparing the newly computed HMAC with that included in the packet by the sender. The sessKey has a lifetime. The SH 12 stores the TH's ID, PK, sessKey and its lifetime in a temporary buffer of the SH 12.

The SH 12 sends a second communication init response to the TH 31. The response includes the sessKey encrypted by the TH's PK and the response message is signed by the SH's private key. The TH 31 receives the second communication init response and compare the SH's hostname, ID and PK received from the SH 12 with those retrieved from the SH's HNR to verify the SH's identity.

When the verification is success, the TH 31 copies the temporary buffer containing the SH's ID, GLoc, PK and LLoc and the sessKey to the security association table (SAT) of TH (31).

The TH 31 sends a communication init complete message to the SH 12. The message is integrity protected by an HMAC computed using the sessKey. The SH 12 receives and checks the communication init complete message to confirm whether the TH 31 has accepted the connection request or not.

The SH 12 copies the temporary buffer that contains the TH's ID, GLoc, PK and LLoc to a SAT of the SH 12. The SH 12 also saves the sessKey in the SAT.

The SH 12 starts sending data to the TH 31 or the SH 12 starts receiving data from the TH 31.

Example 1

This section describes the first example of the invention in three steps. In the first section we describe name registry security; in the second section we describe network access security, and in the last section we describe the security method for securing data communication.

Name Registry Security

The name registry constitutes two types of registries, i.e. DNR and HNR [HIMALIS]. A DNR stores the mapping between domain names (e.g. idloc.nwgn.jp) and HNR's ID and locator; while the HNR stores the mapping between hostname and host ID, locator, PK and other parameters of the host.

This invention specifies security methods for the DNR and HNR. For DNR security, it extends the concept and procedure used in DNSSEC [DNSSEC] and for securing HNR it specifies a new method.

Figure 4:
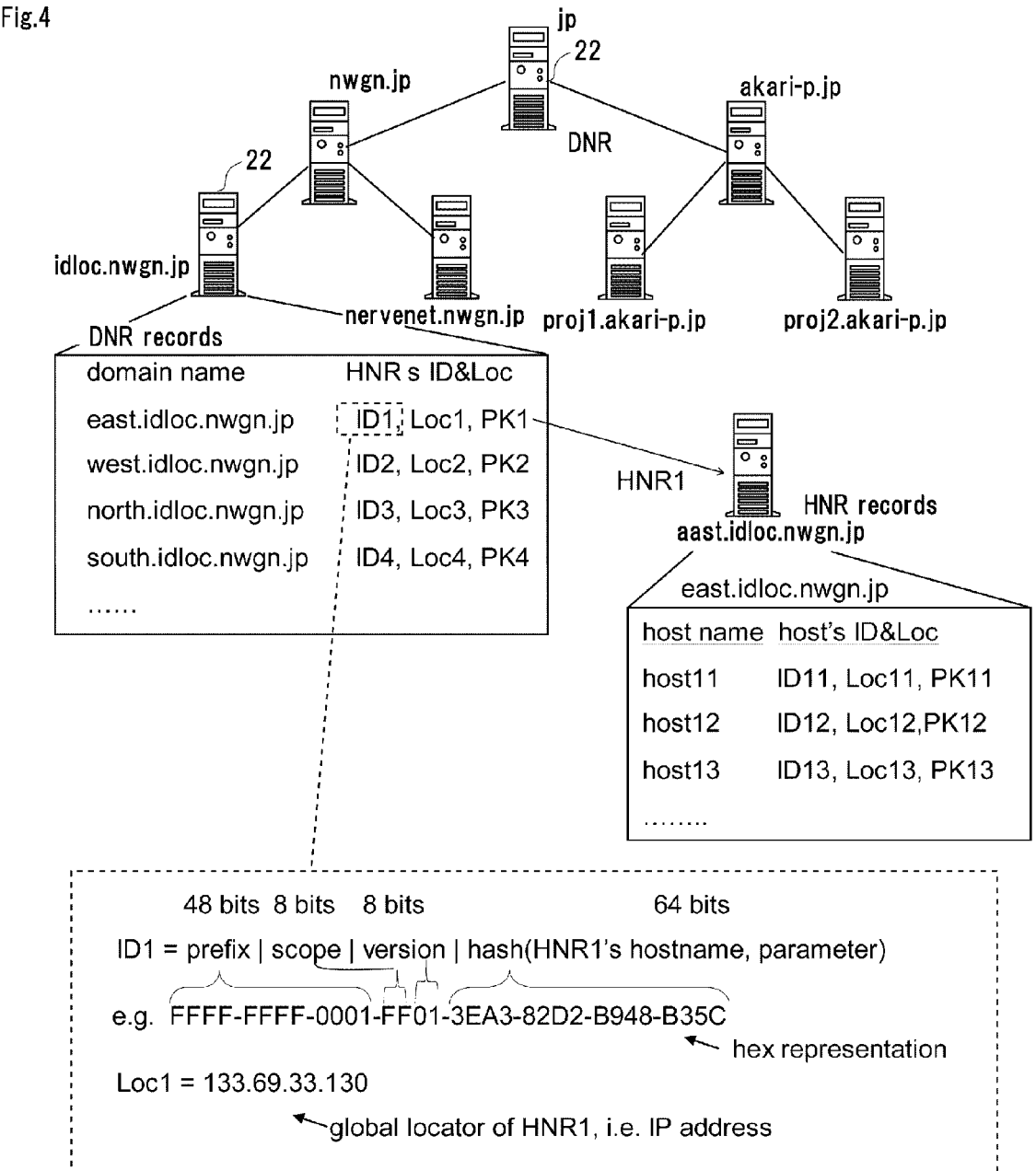
FIG. 4 shows a hierarchical structure of DNR.

DNR are organized in a hierarchical structure (as shown in FIG. 4).

DNSSEC [RFC 4035; Protocol Modifications for the DNS Security Extensions": http://www.ietf.org/rfc/rfc4035.txt] is used to secure DNR records.

We use SRV resource record [RFC 2782, Resource Record (RR) type code=33] to map domain name to HNR server. [RFC 2782] is titled "A DNS RR for specifying the location of services (DNS SRV)" and obtainable at "http://www.ietf.org/rfc/rfc2782.txt".

The format of SRV RR (specified in RFC 2782, page 2) is:
_service._proto.name TTL CLASS SRV Priority Weight Port# TargetServer We have created a new RR type HID for storing host IDs.

DNR and HNR Records Examples

Below are the examples of DNR records (of idloc.nwgn.jp zone)

_hnr._udp.east.idloc.nwgn.jp 3600 IN SRV 0 0 2900 east.idloc.nwgn.jp (this means that HNR of east.idloc.nwgn.jp domain uses UDP port#2900)

_hnr._tcp.east.idloc.nwgn.jp 3600 IN SRV 0 0 2900 east-.idloc.nwgn.jp (this means that HNR of east.idloc.nwgn.jp domain also uses TCP port#2900)

east.idloc.nwgn.jp IN HID FFFF-FFF0-0001-FF01-3EA3-82D2-B948-B35C (this record specifies the HNR's host ID as FFFF-FFF0-0001-FF01-3EA3-82D2-B948-B35C)

east.idloc.nwgn.jp IN A 133.32.149.1

(this record specifies the HNR's IPv4 locator as 133.32.149.1)

east.idloc.nwgn.jp IN AAAA 2001:BEEF::1001:1

(this record specifies the HNR's IPv6 locator as 2001:BEEF::1001:1)

east.idloc.nwgn.jp <TTL> IN DS <key tag> <algorithm> <digest of HNR's DNSKEY>

(this Delegate Signer record gives the signature of the authority signing the HNR's DNSKEY. The explanations about these parameters are given in RFC 4035.)

Although not shown in the above example, DNR records also include RRSIG (Resource Record Signature) and DNSKEY records whose formats are as specified in DNSSEC [RFC 4035].

The below are the examples of HNR records (of east.idloc.nwgn.jp zone)

east.idloc.nwgn.jp <TTL> IN DNSKEY <protocol value> <public key algorithm> <HNR public key>

(this DNSKEY record gives the value of HNR's public key that is used to sign the HNR records. The signature is stored in the RRSIG record.)

host01# east.idloc.nwgn.jp IN HID FFF-FFFF-0001-FF01-3EA3-82D2-B948-B35C host01# east.idloc.nwgn.jp IN A 133.243.119.192 host01# east.idloc.nwgn.jp IN AAAA 2001:BEEF::2001:1 host01#east.idloc.nwgn.jp IN PK <host public key; parameters are similar to DNSKEY)

In the above example, the PK Resource Record (RR) type has been created for storing host's public keys (which are used to encrypt data packets to be sent to the host). Each HNR record may also include an RRSIG record.

DNR Record Creation by HNR Registration

HNR stores its ID, its GLoc, its PK and other parameters in the DNR by sending a HNR registration message whose format is similar to the dynamic DNS update message as specified in DNS UPDATE [RFC 2136 available at "http://www.ietf.org/rfc/rfc2136.txt"]. The message contains TSIG [as specified in RFC 2845 available at "http://www.ietf.org/rfc/rfc2845.txt"] to prevent the message from being modified on the way. TSIG (Transaction SIGnature) is a computer networking protocol. It is used primarily by the Domain Name System (DNS) to provide a means of authenticating updates to a Dynamic DNS database.

Each HNR has an authority DNR, with whom the HNR has established a shared secret key using some method. HNR knows its DNR's ID and DNR's GLoc (the network administrator has stored them in the HNR setup file). One DNR can support many (say n) HNRs; the value of n depends on the number of HNR records the DNR can hold and update. The HNR sends a HNR registration request to the authority DNR. The message is protected by TSIG which is computed by using the secret key shared between the HNR and DNR ([RFC 2845]).

HNR Record Creation by Host Registration

Figure 5:
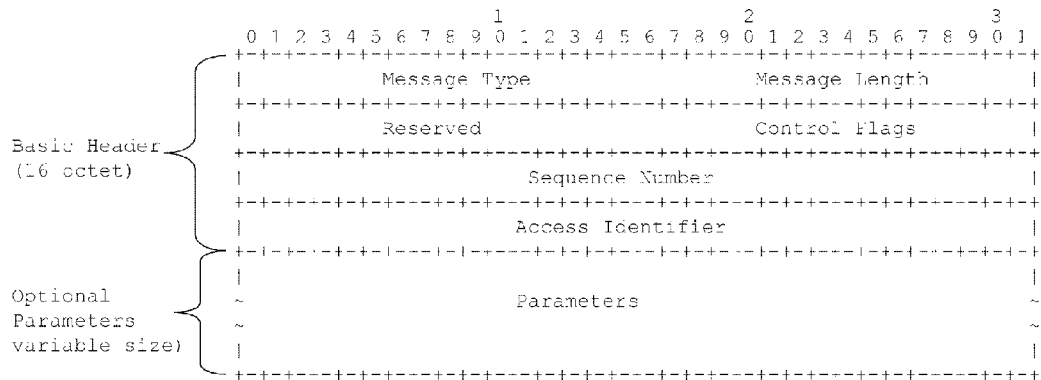
FIG. 5 is a format of host registration message.
Figure 5:
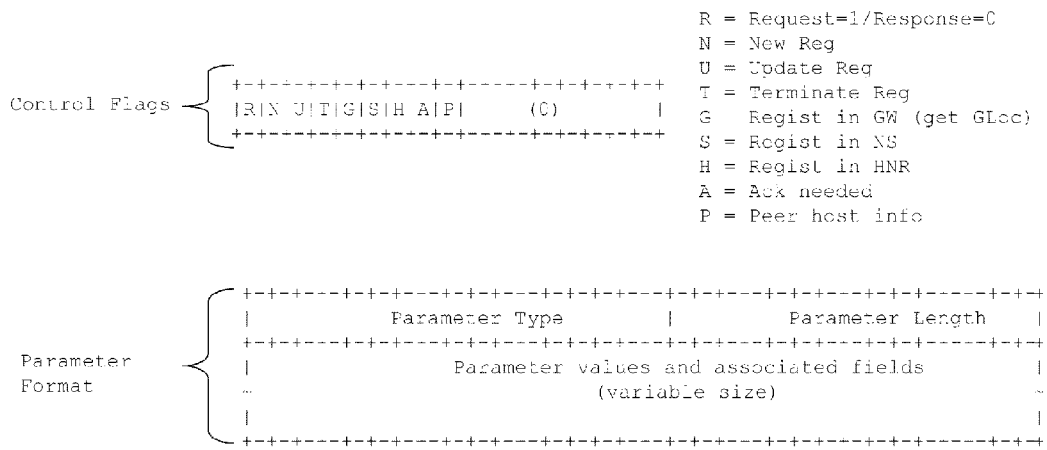

A host stores its hostname, ID, locator, PK and other parameters in the HNR by sending a host registration message whose format is specified in FIG. 5.

The message has two parts: basic header and parameters field. The basic header has size of 32 bytes and consists of the following fields.

Message Type (2 bytes): specifies the type of the message. For host registration in HNR, message type is set to 1. (Note: the same message header is also used for hostname resolution [Message Type=3] and peer host registration in GW [Message Type=2])

Message Length (2 bytes): specifies the length of the message including both the basic header and the parameters.

Reserved (2 bytes): This field is reserved for the future extension of this invention.

Control Flags (2 bytes): This field is used to specify additional meaning associated with the message. Each flag is of 1-bit long. The following flags have been defined.

R is set to 1 to indicate that the message is a "request" message. If R=0, the message is the response message. The request and response messages have the same sequence number and accessID.

N is set to 1 to indicate that the message is for the "new" registration of hostname, host ID, locator or other parameters.

U is set to 1 to indicate that the message is for the "update" of registration.

T is set to 1 to indicate that the message is for the "termination" of registration.

G is set to 1 to indicate that the request is for registering ID, locator or other parameters in the GW.

S is set to 1 to indicate that the request is for registering ID, locator or other parameters in the local name server, LNS.

H is set to 1 to indicate that the request is for registering ID, locator or other parameters in the HNR.

A is set to 1 only in request messages to indicate that the sender wish to receive an acknowledgement from the receiver.

P is set to 1 in a request message to register "peer" host's hostname, ID, and locator in the GW.

Sequence Number (4 bytes): specifies the sequence number of the message.

Access Identifier (4 bytes): specifies the access identifier given by the access network at the time the host attaches with the network. The combination of the sequence number and access identifier identifies a message uniquely.

The parameters field carries the message content in the form of one or more parameters. For example, host ID, locator, PK or other information would be included in this field. Each parameter would contain parameter type (2 bytes) and parameter length (2 bytes) fields which are followed by the parameter value. The size of a parameter value would be variable, e.g. 4 bytes for an IPv4 locator, 16 bytes for IPv6 locator, and 16 bytes for host ID.

The host (or authentication agent) sends the host registration or update message containing the hostname, host ID, locator, PK and other parameters to the HNR when the host connects to a new network as specified earlier. The HNR stores the host information in its database. The database contents are called HNR records.

Hostname Resolution Process

Figure 6:
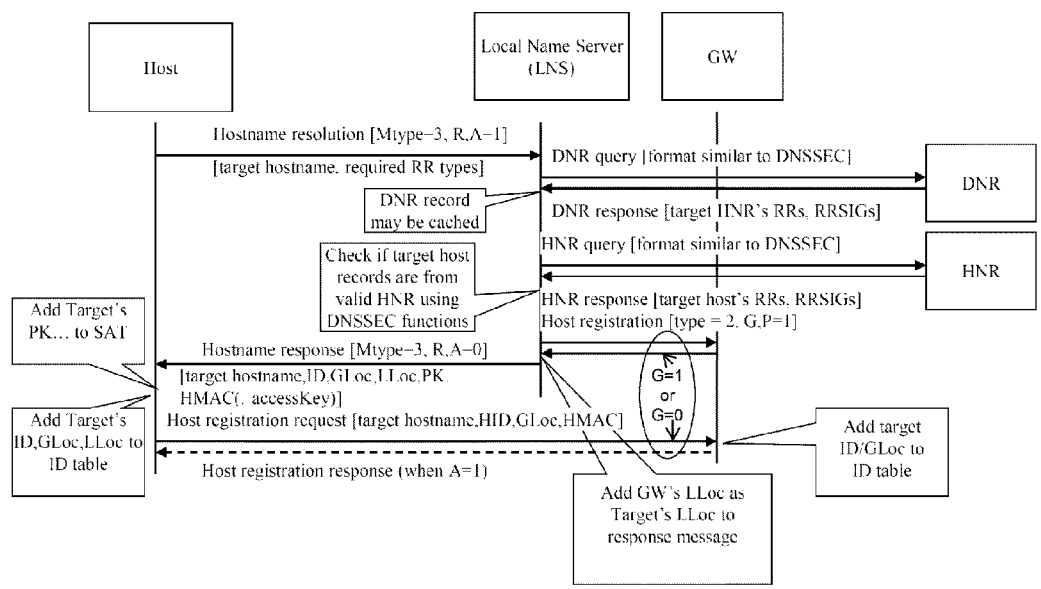
FIG. 6 shows a sequence of messages exchanged for hostname resolution.

The host resolution process includes a sequence of request (or query) and response (or answer) messages (shown in FIG. 6). These messages are exchanged from the application layer. The hostname resolution and response messages may use the same port # as used by DNS query and response. The figure includes two cases: (1) when LNS registers target host's ID and locator in the GW (for G flag is set to 1 in host registration request message), and (2) when the source host registers target host's ID and locator in GW (for G=0 in host registration request). This process is initiated by a host (called source host or SH) that wants to know about the other host's (called target host or TH) host ID, locator, or PK. For hostname resolution, the source host initially knows only the target host's hostname. The source host sends a hostname resolution request containing the TH's hostname and receives back a response containing the TH's ID, locator, and PK from the HNR as Resource Records (RR). The source host uses the target host's ID, locator and PK to start a communication session with the target host.

The detail of hostname resolution procedure is as described below.

(a) The source host sends a hostname resolution request for obtaining target host's ID, locator or PK. It requests for the locator types that the source local network can support. (For example, if the source local network supports only IPv4 (or IPv6) protocol, the source host issues the hostname resolution request only for obtaining IPv4 (or IPv6) locator of the target host. If the source local network supports both IPv4 and IPv6 protocols, then the source host issues a hostname resolution request for obtaining both IPv4 and IPv6 locators of the target host.)

(b) The hostname resolution request is received by the LNS, which work as the name resolver. The LNS first checks its own host table to find if the target host is located in the same network. If no record is found, it resolves the TH's hostname into TH's ID, locator and PK by sending a query to the DNR and then another query to the HNR. Both the DNR and HNR query formats are similar to a DNSSEC query.

(c) From DNR, the HNR's ID and locators (of both IPv4 and IPv6 types) are obtained. The LNS may request for only one type of locator (of HNR) depending on if the source GW supports only one type of protocol in the global network.

(d) Similarly, the LNS issues the HNR query message to obtain the locator RR types that the source GW supports in the global network interface. (For example, if the GW's global interface supports only IPv4 (or IPv6) protocol, then the LNS requests the HNR to provide only IPv4 (or IPv6) locator of the target host. Thus, the LNS receives the target host's locator types that the source GW can understand.)

(e) LNS verifies the authenticity of the target host's RR using DNSSEC security functions.

Figure 7:
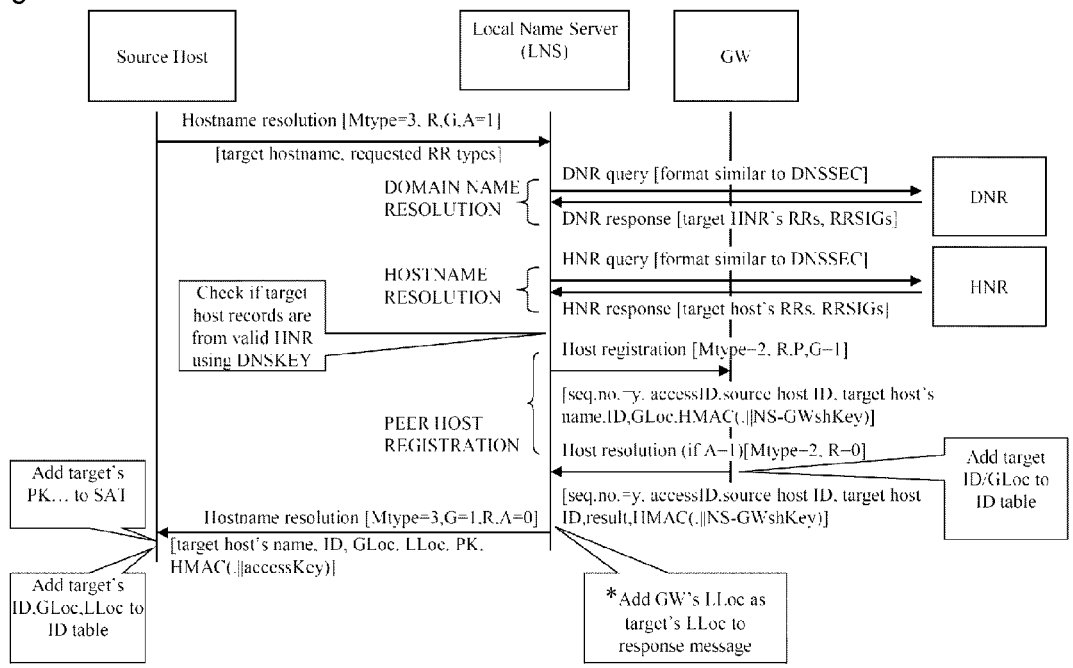
FIG. 7 shows a sequence of messages exchanged for hostname resolution [when the local name server (LNS) performs the registration of the target host's ID/locator mapping in the source GW.].

(f) Now LNS has the target host's ID and global locators. It can register them in the source GW if the source host had set G=1 in the hostname resolution request message (as shown in FIG. 7) by sending a host registration request [Message Type=2]. The GW adds the target host's ID and locator in the GW's ID Table as the corresponding hosts of the source host. Then, the GW may send a response (or acknowledgement or ACK) message to the LNS if "A" flag was set in the host registration request message. The LNS may unset A flag in the host registration request to reduce signaling overhead. The message exchanged between the LNS and the GW is protected by their shared security key (LNS-GWshKey). To the response received from the HNR, the LNS now adds the local locator of the GW (with which the peer host registration has been taken place) as the local locator of the target host and forwards the response to the host. In other words, the local resolver or LNS gives the answer to the source host by adding the GW's local locator as the target's local locator (as LLOC RR type). Note: the LLOC RR type is not stored in HNR/DNR; it is rather supplied by the LNS located in the Edge Network.

(g) If G=0 in the hostname resolution request received from the host, the LNS does not register the target host's ID and GLoc in the source GW. It rather provides all the GLoc to the host in the hostname resolution response. In case there are many GLoc(s) for the target host, the host performs target host's locator selection by using an algorithm.

Figure 8:
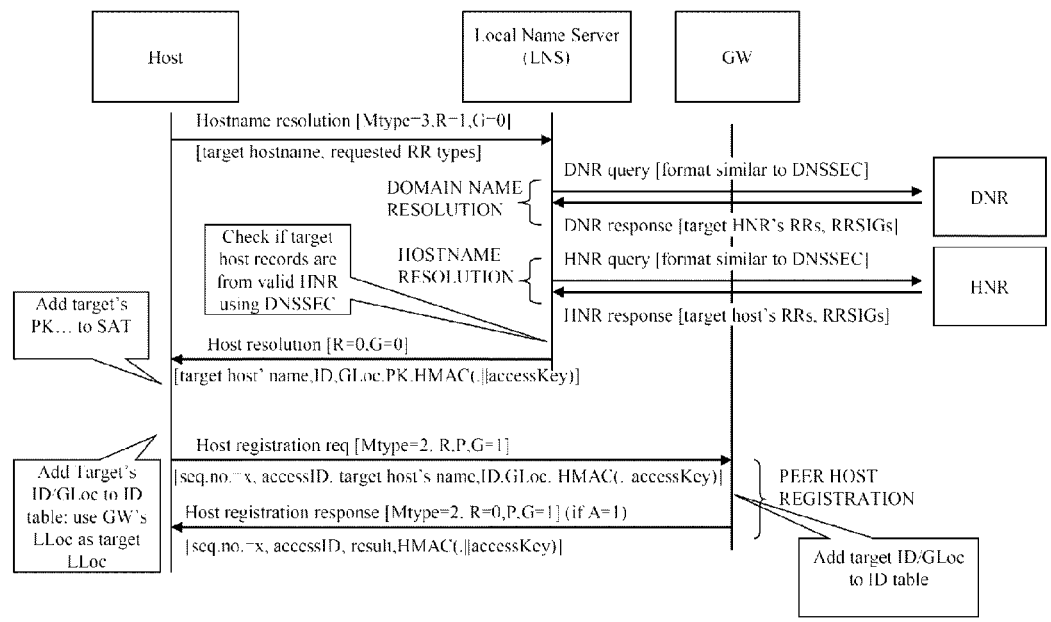
FIG. 8 shows a sequence of messages exchanged for hostname resolution [when the source host performs the registration of the target host's ID/locator mapping in the source GW.].

Then it registers the selected GLoc in the GW by sending a host registration request as shown in FIG. 8. The message exchanged between the host and GW includes accessID and is protected by accessKey, which is the access ID of the host in the Edge Network (received from the AA during attachment) and the sequence number value depends on the number of control packets the host has exchanged with the local network entities (AA, LNS, and GW). The host may set A=0 in the registration request message, so that the GW is not required to send the response back to the host (to reduce overhead).

Thus, the source host receives GLoc of the target host by the hostname resolution. The source host uses the target GLoc in the network layer protocol (in packet network header) packet only if the source host use the global protocol in the Edge Network. Otherwise, it will use the source GW's LLoc as the target host's LLoc in packet header and forward the packet to the GW. It will use the target GLoc in mobility and other signaling messages.

Network Access Security

Network access is the process by which a user device or host gets connected to the network before it can use the network services.

Some Background Information

A large scale networks such as the Internet that spreads over a wide area (possibly across several countries) is usually composed of two types of networks: Edge Network and backbone network. The Edge Network provides network connectivity to user devices or hosts; while the backbone network connects two or more Edge Networks together. In this invention, the Edge Network is also called as access network and the backbone network as core or global network. The locator (i.e. the location identifier) of a device in the local network is called local locator (LLoc) and that in the global network is called global locator (GLoc). A host is allowed to use the GW's GLoc as the host's own GLoc.

Each Edge Network has the following four entities (which can collocate in the same machine or can, alternatively, exist separately): Dynamic Host Configuration Protocol (DHCP) Server, Authentication Agent (AA), Local Name Server (LNS), and gateway (GW).

AA authenticates hosts when they connect to the Edge Network. AA includes the network access authentication server function. In other words, AA receives the authentication request from the host and verifies the host information by comparing it with the host's record in HNR (obtained by the hostname resolution). AA may also contact additional authentication servers to authenticate the host.

LNS stores records (which include hostname, ID, LLoc, PK, etc.) of local hosts that are currently connected to the Edge Network.

GW connects the Edge Network with the global network. GW provides L3 protocol conversion using ID/locator mappings stored in its ID table (the table entries are created by host registration, which will be explained latter, or by hostname resolution.)

The DHCP server provides initial setup parameters (e.g. host's LLoc, AA's ID and LLoc, LNS's ID and LLoc, GW's ID and LLoc) to the host.

All messages exchanged between any two of these entities are protected by using HMAC (Hash-based Message Authentication Code) computed over the message and a shared secret key. We assume that the AA, LNS, and GW have three different secret keys, represented by AA-LNSshKey, AA-GWshKey, and LNS-GWshKey. They use these secret keys to protect the messages exchanged between them.

Initial Host Registration Procedure

Figure 9A:
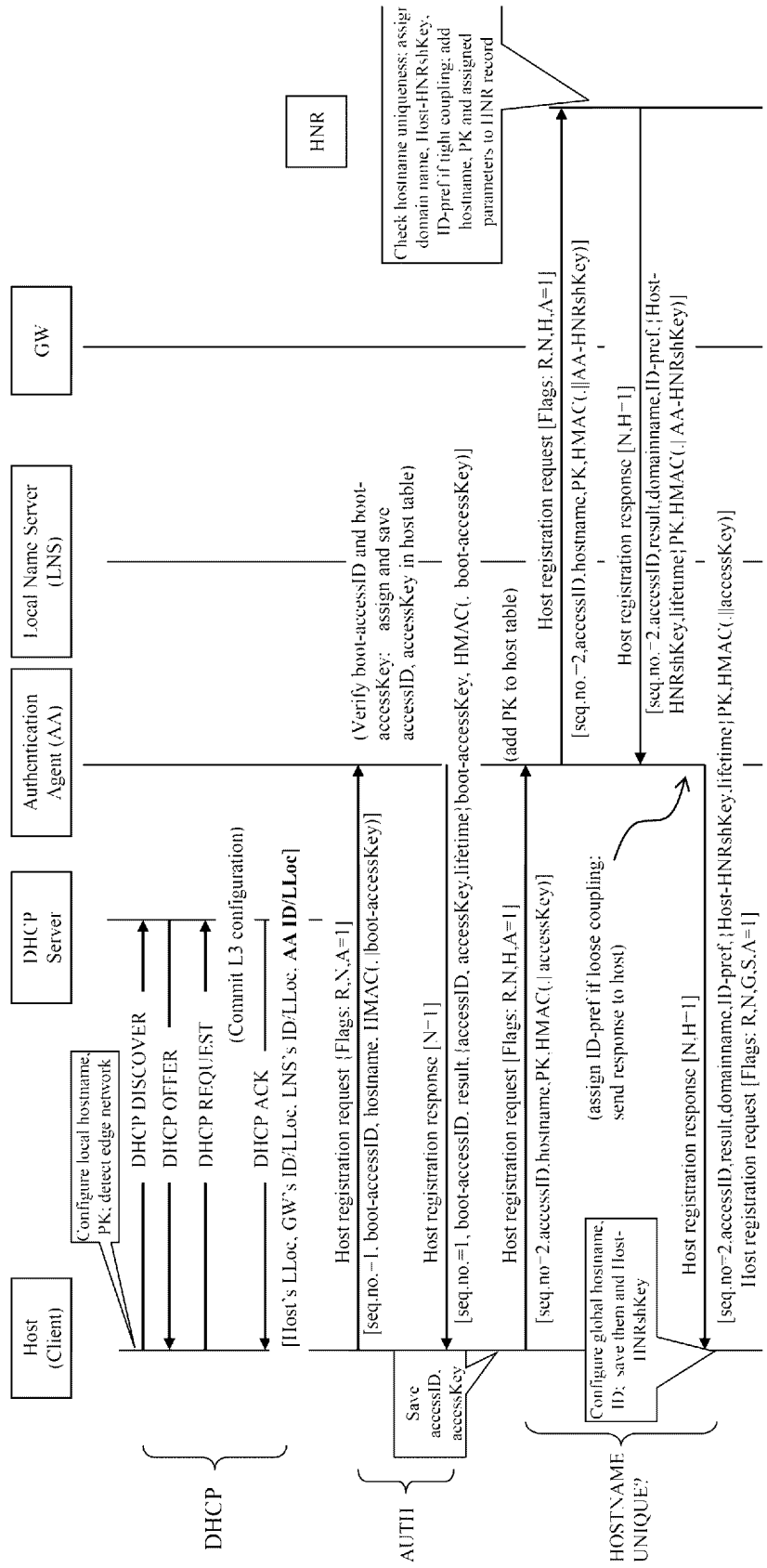
FIG. 9A shows a part of sequence of messages exchanged for host registration (for the first time registration).
Figure 9B:
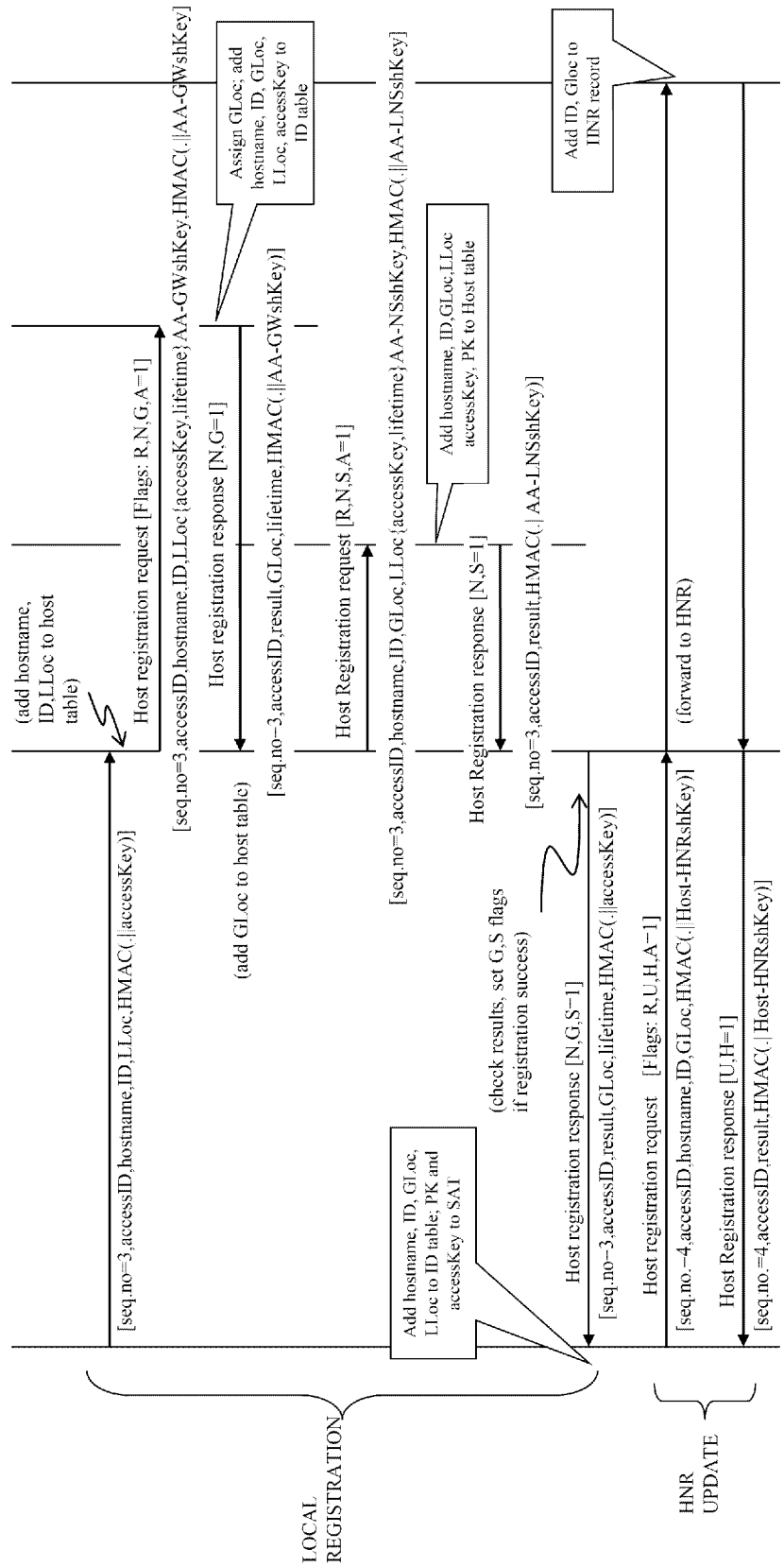
FIG. 9B shows the rest of sequence of messages exchanged for host registration (for the first time registration).

This subsection describes the procedure by which a host gets connected to the network for the first time. The procedure is shown in FIGS. 9A and 9B. These messages are exchanged from the application layer. They may use some unused port#. Alternatively, they can be exchanged from the ID layer.

When a host is switched on for the first time, the host first configures its local hostname (by itself or with the help of its owner/administrator, using attributes related to user's name, usage, date, location, etc.) and its PK.

Then the host searches its "home" Edge Network in its surrounding by executing DHCP protocol [DHCP]. By DHCP, the host gets its own temporary LLoc as well as IDs and LLocs of AA, LNS, and GW. After getting these parameters, the authentication step starts.

For authentication, the host sends a host registration request to AA. The request message includes local hostname and the security parameters such as boot-accessID and boot-accessKey. (We assume that the host has already obtained a boot-accessID and boot-accessKey from its home network by some other means (maybe by an initial key assignment method). The host uses these boot-access ID and boot-accessKey for its authentication with the home network.)

The host registration request message contains no host ID because the host has not configured its host ID yet. The host registration message format is shown in FIG. 5. The accessID in the message header is set to the boot-accessID for this message.

AA checks host authenticity (i.e. verifies the boot-accessID and boot-accessKey) and assigns an new access ID (accessID) and an access key (accessKey) to the host. accessKey will later be used by the host to authenticate itself with the AA, LNS, and GW. accessed and accessKey have some definite lifetime which is specified by the AA when allocating them to the host. The same accessID is used in all the control messages the host exchanges with the Edge Network entities (e.g. AA, LNS, and GW). The combination of the accessID and sequence number (seq. no.) represents the message uniquely.

The host then sends another host registration request containing its hostname and public key (PK) to AA. AA forwards the host registration message to the HNR. The message is protected by the pre-shared secret key (AA-HNRshKey). We assume that the "home" AA knows HNR's ID, locator and AA-HNRshKey from its configuration file.

HNR checks the uniqueness of the hostname within its domain, and then assigns the domain name, host ID prefix and a shared key (Host-HNRshKey valid for a lifetime) to the host. The HNR stores the hostname, PK, and Host-HNRshKey (along with lifetime) in the HNR record. Then it sends a host registration response message to the AA, by encrypting Host-HNRshKey and its lifetime by the host's PK. AA forwards the response message to the host.

The host configures its global hostname by concatenating its local hostname and the global domain name. It also forms its ID by hashing its global hostname and adding prefix, scope and version labels. The detail about the host ID formation is specified in [PLT1, JP Patent Publication 2008-312191 A]. It saves its hostname, ID and Host-HNRshKey (along with its lifetime) in the host configuration file. Then the host performs local registration by sending a host registration message containing its global hostname, ID, and LLoc to AA [setting R, N, G, S, and A flags to 1]. The AA registers the host information to the GW and LNS. The GW also provides a GLoc (which also has a lifetime) for the host (NOTE: GLoc is the GW's locator obtained from the global network side). After finishing GW and LNS registration, AA replies the host with a host registration response message containing the GLoc.

The host saves its GLoc in its configuration file and performs HNR record update by sending a host registration message via the AA. This completes the host's initial network access procedure and registration in the HNR and home edge network. Now the host is ready for communication with any other host. It can also move to other edge networks, where it will perform the network access procedure described in the following paragraphs.

The network access security provides authentication of hosts before allowing them to connect to the Edge Network. After the host registration in the HNR has been completed as described in the above paragraphs, the host can move to any new Edge Network (that can be different from the host's home network), get connected to the new network using a network access procedure as described in the following paragraphs.

Network Access Procedure

Figure 10A:
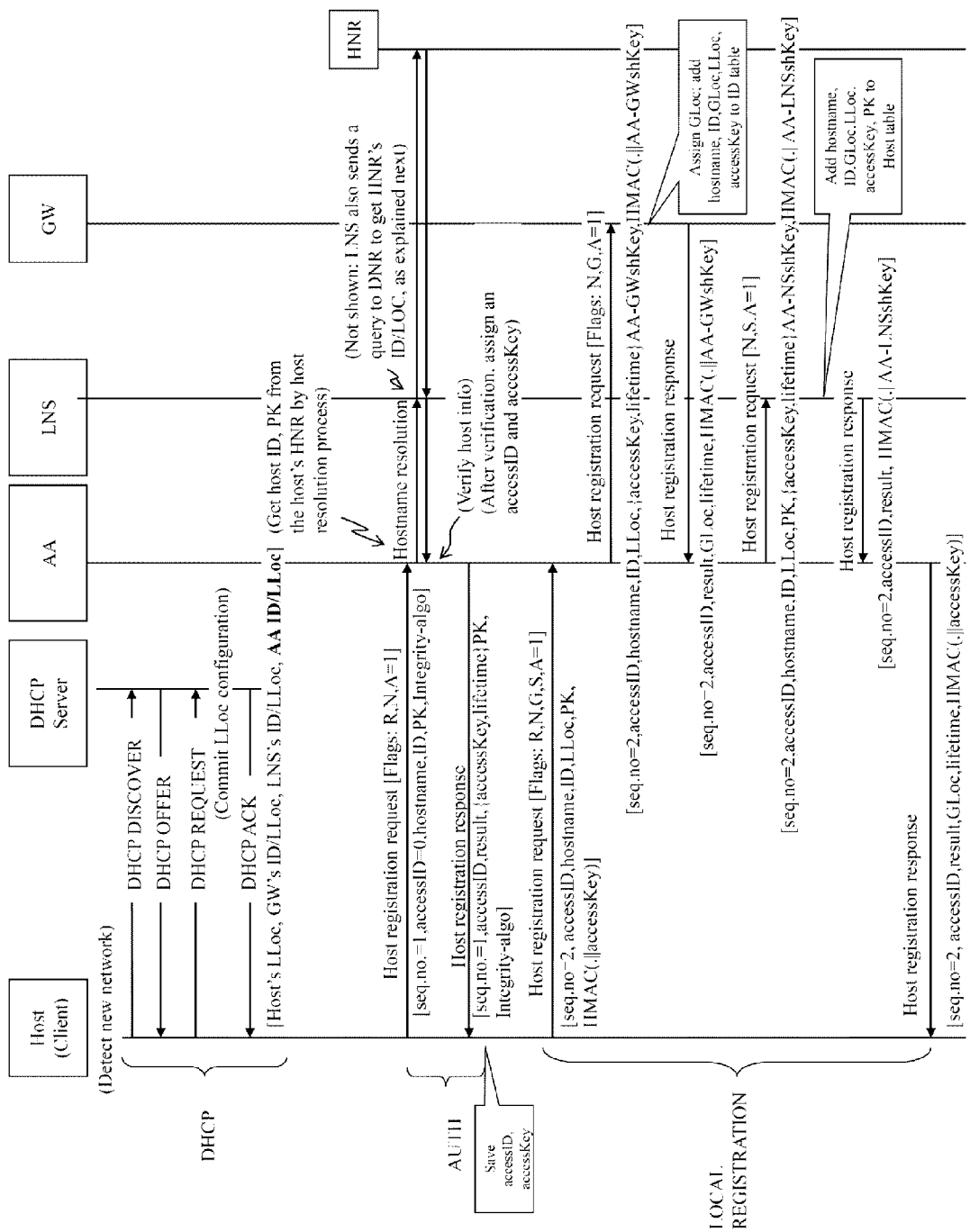
FIG. 10A shows a part of sequence of messages exchanged for network access.
Figure 10B:
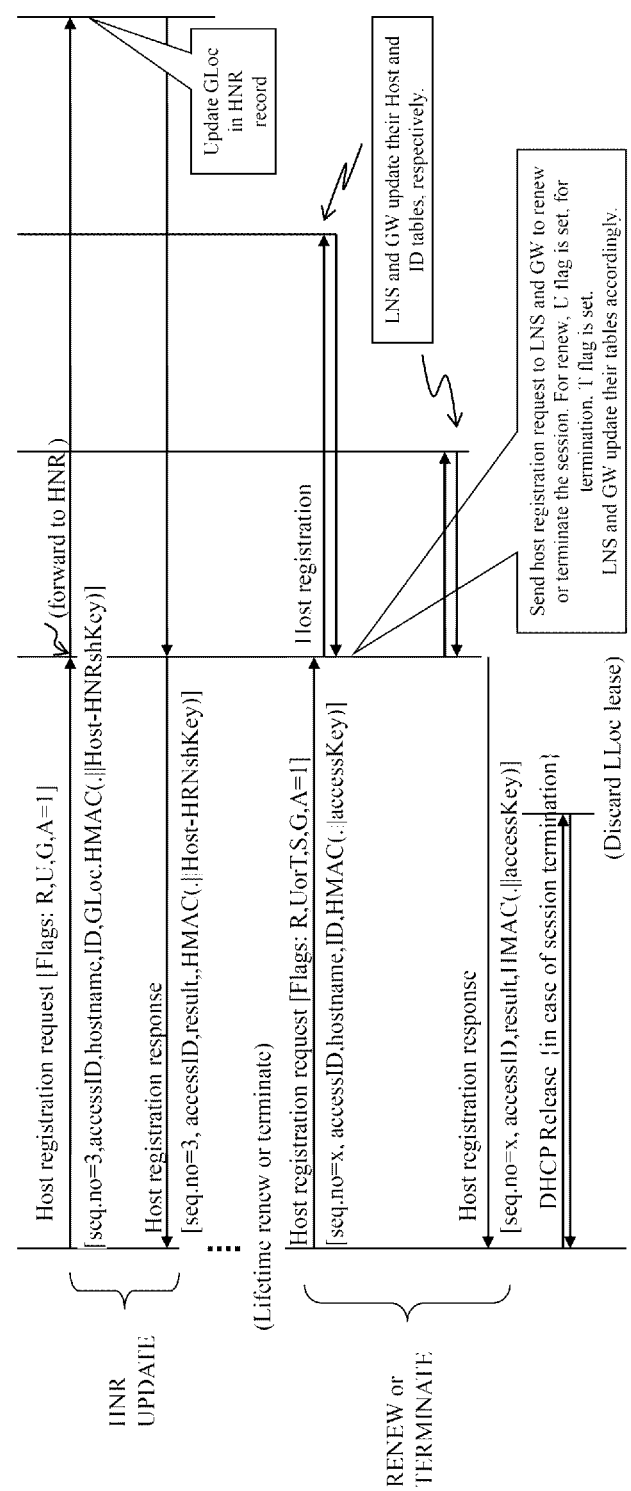
FIG. 10B shows the rest of sequence of messages exchanged for network access.

This subsection describes the procedure by which a host gets connected to the network. The procedure is shown in FIGS. 10A and 10B. These messages are exchanged from the application layer. DHCP uses port#446 for client and 447 for server protocols. Some unused port numbers can be used for host registration messages. Alternatively, the host registration messages can be exchanged from the ID layer. The steps of this procedure are similar to those described in the previous subsection for the host's initial registration. The following paragraphs describe only the differences.

In the first host registration message sent by the host for authentication, it includes its global hostname, ID, PK and one or more Integrity-algorithm types that the host wants use to compute HMAC for protecting subsequent messages exchanged with the AA, GW, and LNS.

After verifying the host identity (by getting host records from the HNR through a host resolution process), AA selects the appropriate Integrity-algorithm from the list provided by the host. The integrity check algorithm may be HMAC-SHA1 [specified in RFC 2404 available at "http://www.ietf.org/rfc/rfc2404.txt"] (HMAC algorithm is defined in RFC 2104, available at "http://www.ietf.org/rfc/rfc2104.txt"). AA also assigns an accessID and accessKey to the host. In the host response message the accessKey is encrypted by the host's PK.

After getting authenticated from the AA, the host executes the local registration and HNR update processes, which are similar to the process carried out in the first time registration with the home network as explained in the previous section.

When the lifetime of the security association between the host and the network is about to expire, the host renews it by sending a host registration message to AA. AA also renews or updates the host information stored in the GW and LNS by the process similar to the local registration shown in FIGS. 10A and 10B. Similarly, when the host is moving to another access network (in proactive or make-before-break handover), it executed a graceful disconnect or terminate process as shown in FIGS. 10A and 10B.

Host-to-Host Communication Security

When a source host wants to communicate with a target host, the former first resolves the target host's hostname by using the hostname resolution procedure as described in the previous section. The source host then exchanges control signaling packets with the target host to inform about its hostname, ID and locator as well as to negotiate security parameters such as a shared secret key. The security parameters constitute the security context that the hosts would use to secure signaling and data packets exchanged between them.

These control packets can be exchanged either from the application layer or from the identity layer. It is implementation-dependent. However, we think that implementation in the identity layer would be more effective.

Figure 11:
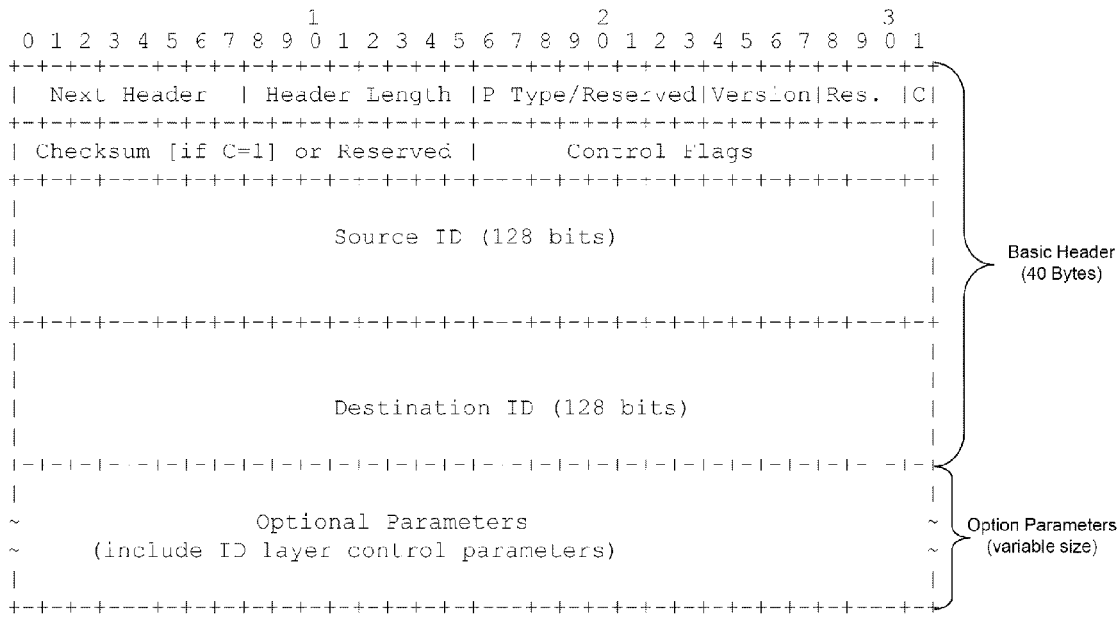
FIG. 11 is an example of an ID header format.

The ID layer protocol attaches an ID header to all the control and data packets. The format of the ID header is specified below and shown in FIG. 11.

Identity Header

The identity or ID header has two parts: basic header and optional parameters.

The basic header size is 40 bytes. The optional parameters can be of variable size. The optional parameters field carries the control information (e.g. additional locators, security related parameters) originated from the identity layer. It carries the authentication data or integrity check value to protect data packets. It also carries the host registration control messages if the host registration procedure is implemented in the ID layer, instead of the application layer.

The basic header has the following fields:

Next Header (1 byte): specifies the protocol number of the next header in the packet payload (usually transport protocol number); if no payload, Next Header=NO_NXT_HDR (59)

Header Length (1 byte): specifies the length of the ID header including optional parameters P (1 bit): set to 1 to specify if the packet contains any upper layer payload Type (7 bits): specifies the ID layer packet type (pType), i.e. type of control message carried in the parameters field Version (4 bits): specifies the version of the ID layer protocol C (1 bit): set to 1 when ID header has control message (carried in the parameters field)

Checksum (2 bytes): specifies the checksum covering the ID basic header and control message carried in the parameter field.

Control Flags (2 bytes): specifies additional control information such as the nature of IDs and their mapping with locators (persistent/temporal, anonymous, etc.). Two flags S and A have been defined as below. S=1 indicates that security functions implemented in the identity layer have been used, and A=1 indicates that the source host likes to send only one packet to the destination host therefore the destination host or GW does not need to save the source host's ID/locator mapping.

Source ID (16 bytes): contains the source host ID

Destination ID (16 bytes): contains the destination or target host ID

Below we explain the procedure to initiate a communication session between hosts, excluding security and including security parameters negotiation producer.

Figure 12:
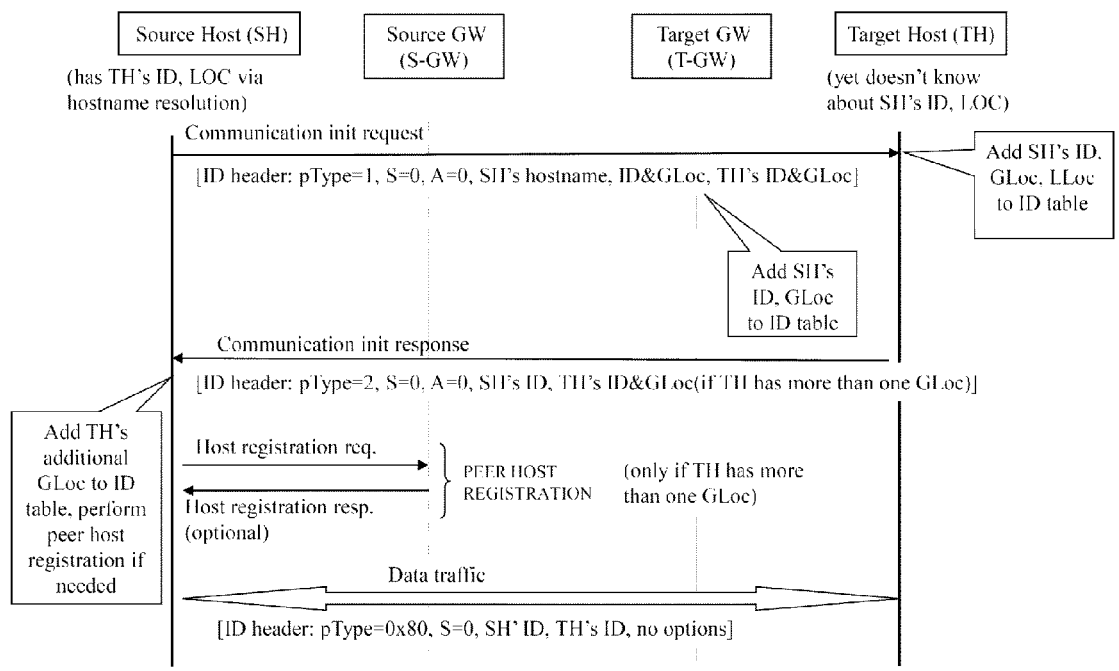
FIG. 12 shows the sequence of control packets exchanged for establishing a communication session with implicit peer host registration, excluding security parameters negotiation.

Communication Session Establishment Procedure (Excluding Security Parameter Negotiation):

When a network application requires no security services from the identity layer, the sequence of control packets exchanged to establish a communication session is shown in FIG. 12 and explained below.

An application in the source host, after having target hostname resolution, opens a socket (with no security option in the socket API (application program interface)) by identifying the socket using the source and destination IDs and transport protocol port numbers.

Then the source identity layer sends a communication init request message, which contains source host (SH) and target host (TH)'s IDs in the identity header as the source and destination IDs, SH's hostname, and SH and TH's Glocs in the identity header parameters field, and S flag is 0 and pType is 1. In the network layer header, the SH's LLoc and S-GW's LLoc are used in the source and destination locator fields.

When the packet reaches the source GW (S-GW), it translates the network layer locators (protocols) to global locators using its ID table, which contains both the SH and TH's ID/GLoc mappings, and forwards the packet to the target GW (T-GW).

Figure 13:
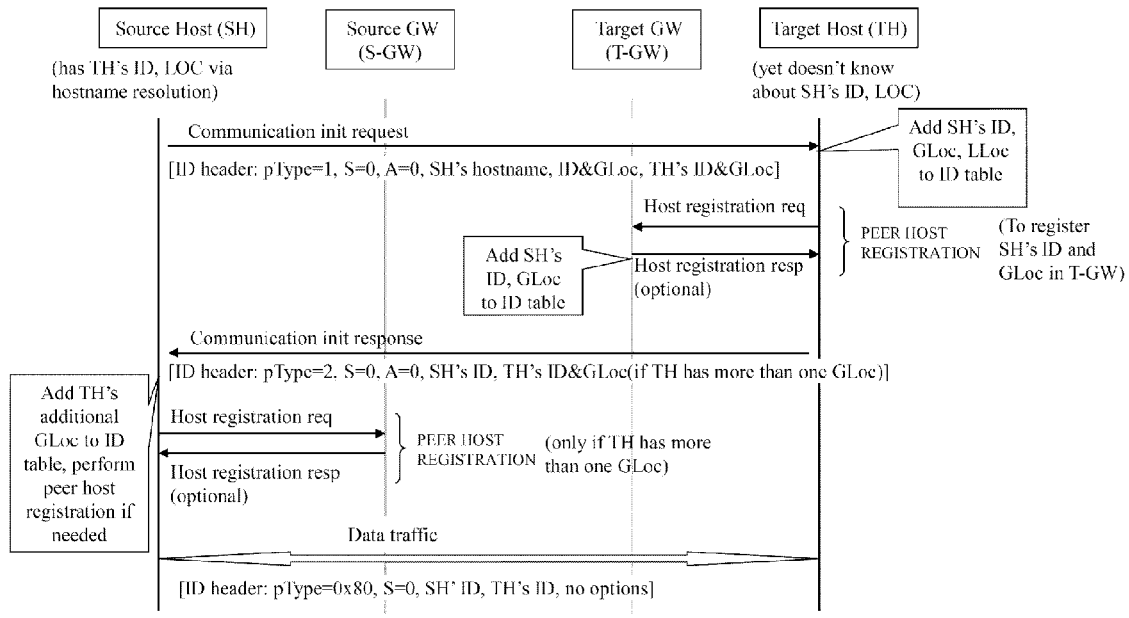
FIG. 13 shows the sequence of control packets exchanged for establishing a communication session with explicit peer host registration, excluding security parameters negotiation.

T-GW again translates the network layer header by consulting its ID table to get TH's ID/LLoc mapping. It uses TH's LLoc in the destination locator and its own LLoc as the source locator in the network header. The packet is then forwarded to the TH. Note that the T-GW's ID table does not yet contain the SH's ID/GLoc mapping. And without this mapping, the TH cannot send back a response to SH. There are two possible methods for registering SH's ID/GLoc in T-GW: implicit peer host registration (FIG. 12) or explicit peer host registration (FIG. 13).

Implicit Peer Host Registration Method:

In the identity header of packets received from the global network, T-GW first checks the value of pType field. If pType is 1, it then checks A flag. If A=0, it caches the SH's ID/GLoc (ID is available in the identity header's source ID field and GLoc is available in the identity header parameters field) in its ID table. Then it translates the network header (using TH's LLoc in the destination locator field and its own LLoc in the source locator field) and forwards the packet to the TH.

Explicit Peer Host Registration Method:

T-GW requires explicit signaling from the TH to store the SH's ID/GLoc in the T-GW's ID table. In this method, when the TH receives the communication init request packet (pType=1), it performs peer host registration as specified previously in the hostname resolution section.

Both of these methods have pros and cons. The implicit method is better for reducing signaling from the target host, but may be vulnerable to security attacks. The explicit method is better for the GW in the sense that it allows the GW to be free from saving the source host's ID/GLoc mapping until the target host decides if it wants to communicate with the source host. If it does not like to communicate, it will not perform peer host registration. Explicit signaling method is also suitable if the TH has many GLocs and it wants to new GLoc (different from what the SH has mentioned in the communication init message), it can perform the peer host registration to the different GW that is the entry point for the new GLoc.

The TH and T-GW negotiate about the peer host registration method at the time when the TH attaches with the network.

After receiving the communication init request packet, TH adds the SH's ID, GLoc and LLoc (i.e. LLoc of T-GW) to its ID table. Then it configures a communication init response message, whose identity header has pType=2, S=0, A=0. The identity header parameters field may contain the additional GLocs of the TH (if the TH has many Glocs). The response message has TH's LLoc and T-GW's LLoc in the source and destination locators. The packet is then sent to T-GW, which translate the network header by using its ID table. In this way the response packet reaches SH.

After receiving the communication init response, SH adds TH's additional GLoc (if any) to its ID table. (SH will also perform peer host registration in S-GW if it wants to send packets to TH's additional GLoc). SH now starts sending data packets by setting the identity header pType=0x80 and with no parameters. These packets reach TH via S-GW and T-GW where they undergo network header translation.

Figure 14:
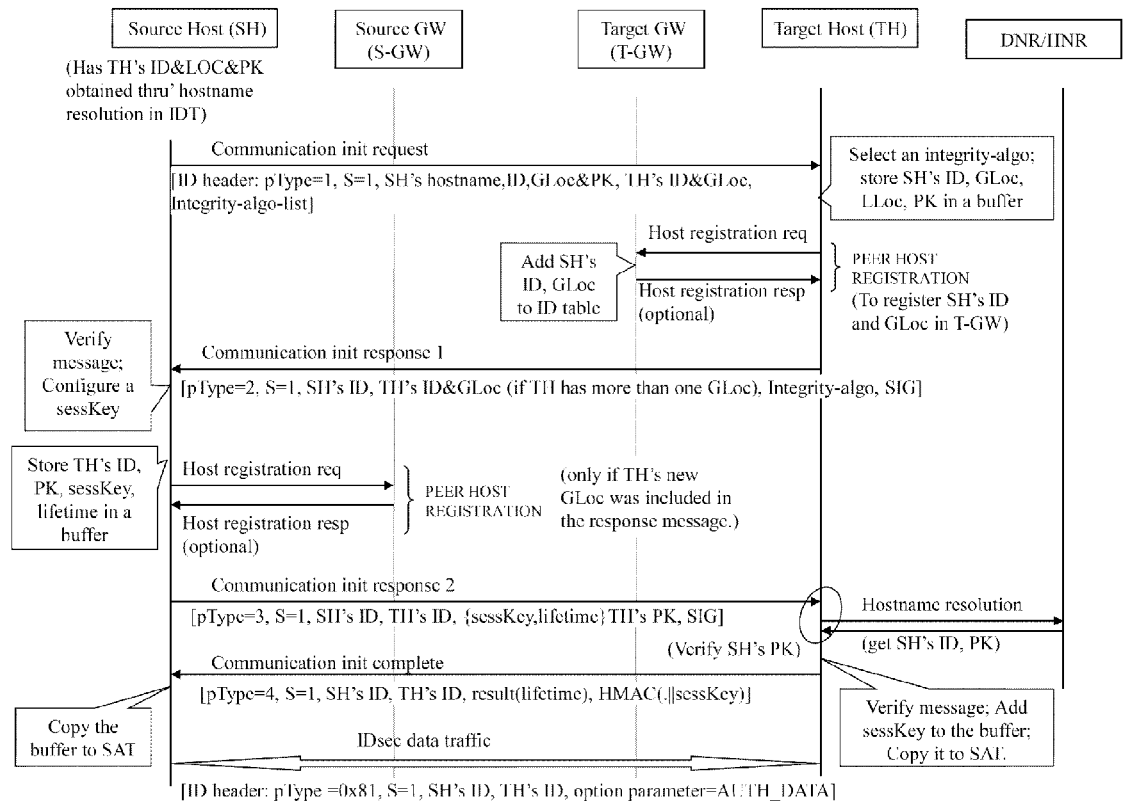
FIG. 14 shows the sequence of control packets exchanged for establishing a communication session with security parameters negotiation [although the peer host registration in T-GW and S-GW is not shown in the sequence].

Communication Session Establishment Procedure (Including Security Parameter Negotiation):

When a network application requires security functions of the identity layer, the source and target hosts negotiate security parameters (such as session secret key, and integrity algorithm) by exchanging four control packets in the communication initialization phase. The four control packets are shown FIG. 14.

The first two control packets are similar to those exchanged in the previous subsection. The values of host IDs present in the ID basic header and the locators in the network header would be the same as mentioned in the previous subsection.

The communication init request message also contains the source host's PK and integrity algorithm list (such as HMAC-SHA1 and HMAC-SHA256) which can be used to compute HMAC to protect the control packets as well to compute authentication data or integrity check values to protect data packets that would be exchanged after these four control packets. S flag is set to 1. As mentioned earlier, the communication init packet goes under the network layer protocol translation in S-GW and T-GW.

On receiving the communication init request, the target host stores in a temporary butter the SH's ID, GLoc, PK and LLoc (i.e. the LLoc of T-GW) as well as the selected integrity algorithm. Then it configures a communication init response 1 message, whose identity header has pType=2, S=1, A=0. The identity header parameters field may contain additional GLocs of TH (if TH has many Glocs). The message is protected by signing the packet with TH's private key. The signature (SIG) is included in the parameters field of the ID header. The packet is then sent to SH.

SH generates a secret session key (sessKey) which would be used to protect packets exchanged between the hosts. A lifetime is also associated with sessKey. It then stores TH's ID, PK, sessKey and its lifetime in a temporary buffer. After that it configures a communication init response 2 message containing sessKey encrypted by TH's PK. The message is signed by SH's private key and sent to TH.

To verify SH's identity, TH compares SH's hostname, ID and PK received from SH with similar values retrieved from SH's HNR by performing a hostname resolution process. If the verification is success, TH copies the temporary buffer containing SH's parameters to the security association table (SAT). It also adds sessKey and associated lifetime received in the communication init response 2 message to the SAT. It then configures a communication init complete message by including the result of session initiation process. The message is protected by including a HMAC computed using sessKey. The communication init complete message is sent to SH.

SH checks the result parameter in communication init complete message to decide if TH has accepted the connection request from the source host. It may also contain the value of sessKey's lifetime if TH has altered the value from what SH has proposed in communication init response 2 message. If the result is OK, SH copies the temporary buffer than contains the security parameters to its SAT.

Although the peer host registration in T-GW and S-GW is not shown in the sequence, it is performed as mentioned in the previous subsection.

Then the source host starts sending data packets whose ID header would contain the authentication data or integrity check values computed using the negotiated security parameters. We call this function as IDsec.

IDsec—Data Packet Security from ID Layer

The security contexts established in hosts by using the communication init process described in the previous subsection are used to provide data packet integrity and origin authentication.

Figure 15:
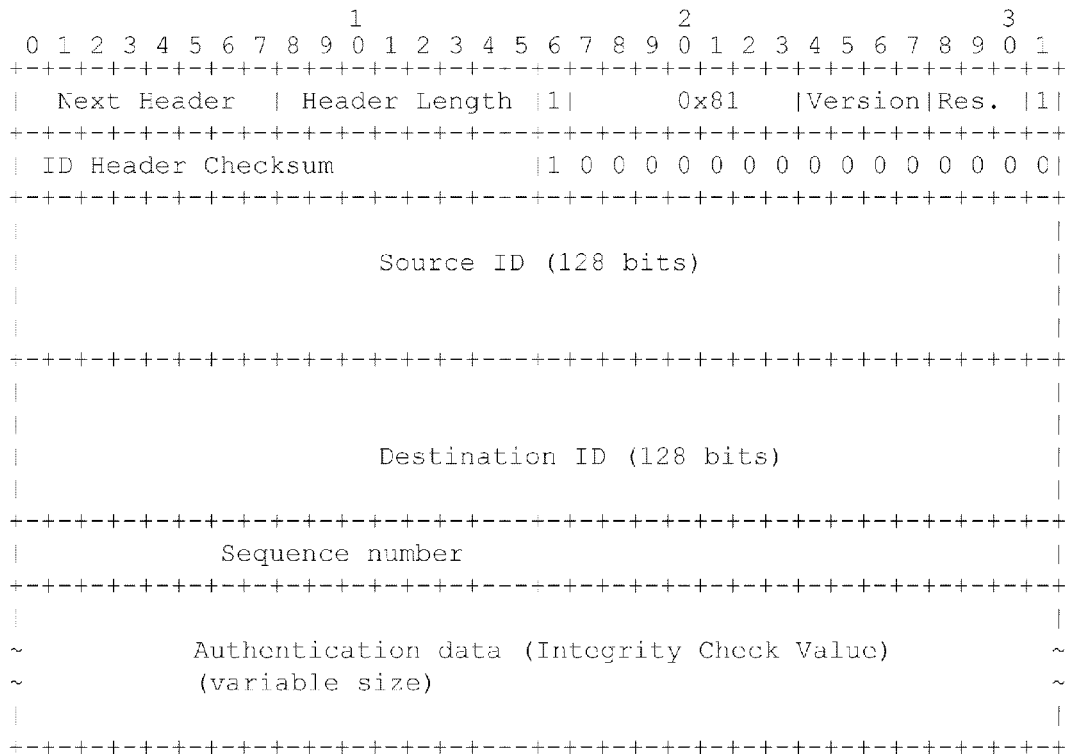
FIG. 15 is an example of IDsec authentication header format.

The data packet sequence number and integrity check value (AUTH_DATA) is included in the parameters field of the ID header as shown in FIG. 15.

ID header basic fields: S=1; pType=IDsec header (0x81).

AUTH_DATA is HMAC computed over the ID header (authentication data field value is set to zero for this computation) and upper level payload, using the integrity algorithm negotiated during the communication init phase. The algorithm may be HMAC-SHA1 [specified in RFC 2404].

Upon receiving a packet with IDsec authentication header, the receiver performs the packet's integrity check and origin authentication by consulting the SAT for necessary security parameters.

Example 2

The HIMALIS architecture consists of the Edge Networks, global transit network, and logical control network, is similar to FIG. 1.

Edge Network

The Edge Network provides network access to various end systems or hosts. Each of the Edge Networks may use different layer 3, i.e., L3 protocols, for example. The Edge Network consists of the following entities: gateway (GW), local name server (LNS), authentication agent (AA), and hosts.

The GW connects the Edge Network with the global transit network. It performs L3 protocol translation (when the Edge Network is using a different L3 protocol than the transit network) and/or locator translation (when the Edge Network uses different network locator spaces) by using ID/locator mappings stored in its ID Table. Data packets carry both the source and destination IDs and locators in the ID header and network header, respectively. The AA provides access control functions, i.e. authenticates hosts when they connect to the Edge Network. In other words, the AA receives the authentication request from the host and verifies the host information by comparing it with the host's record stored in the host name registries (HNR). The LNS stores all local hosts' hostnames, IDs, local locators (LLoc) and public keys (PK) in the host table. The AA, LNS, and GW belong to the same trust domain and possess pairwise shared secret keys to protect messages exchanged between them. Namely, any message exchanged between these entities is protected by using an HMAC (Hash-based Message Authentication Code) computed over the message and the shared secret key.

The host possesses its hostname, ID, and PK, and obtains its local and global locators from the Edge Network. The hostname has two parts, local host name and global domain name, which are connected together by "#" symbol. An example of hostname is myhost#mydomain.com, where myhost is the local part and mydomain.com is the global domain name. The hostnames are globally unique. The details of the hostname and ID configuration methods are given in "[HIMALIS] HIMALIS: Heterogeneity Inclusion and Mobility Adaptation through Locator ID Separation in New Generation Network, IEICE Transaction on Communications, Vol. E93-B, No. 3, pp. 478-489, March 2010." When the host attaches with the Edge Network, it obtains its LLoc from the locator namespace space used by the Edge Network's L3 protocol for routing and forwarding packets within the Edge Network. The host also obtains its global locator (GLoc), which is actually the GW's global locator assigned by the global transient network. The host uses only its LLoc in the L3 protocol header of packets, while it uses the GLoc for session establishment and mobility signaling. The host maintains a security association table (SAT) containing the IDs, locators, PKs, and parameters of its own and peer hosts.

In addition to the GW, LNS, and AA, the Edge Network also contains another functional entity that would provide the host with initial setup parameters such as the GW's, AA's and LNS's IDs and locators. Dynamic Host Configuration Protocol (DHCP) or router advertisements can be used for this purpose.

Global Transit Network

The global transit network is the collection of service providers' backbone networks that use the same network layer protocol (called global network layer protocol) and single numbering space for global locators, which are used to forward packets from one Edge Network to another. The global network is composed of high speed links and routers for forwarding packets based on the destination locator in the packet header. No network protocol translation occurs in the routers; only the GWs located on the border between the edge and transit networks translate the local network layer protocols (and/or LLocs) into the global network layer protocol (and/or GLocs), and vice versa, for communications expanding across the border.

Logical Control Network

The logical control network contains the hostname resolution system, consisting of the DNR (Domain Name Registry) and HNR, to store and provide hostnames, IDs, GLocs and security keys mapping records. The DNR stores the mappings between domain names and the HNR's IDs and locators, while the HNR stores the mappings between hostnames and IDs, GLocs, and PKs of the hosts. Since HNRs are not mobile, the DNR records are mostly static, whereas the HNR records are dynamic as they need to be updated when hosts change their GLocs due to mobility. For each domain name there is at least one authoritative HNR, which stores the records of all hosts that share the domain name in their global hostnames. The DNRs are organized in a hierarchical structure similar to that of the DNS because the DNS structure is suitable for storing and retrieving static mapping information. The HNRs have a flat-structure.

The proposed security scheme makes the HNRs trustable anchor points so that HNR records can be used to secure the network access, communication sessions, and mobility. In other words, the Edge Network uses a host's record retrieved from the HNR to authenticate the host before authorizing it to access the network. Similarly, a host can utilize another host's record to authenticate the latter before establishing a secured communication session with it. Similarly, by combining the network access and communication session security functions, mobility process can be made secured. We present these security functions in the following sections.

Mapping Registration and Retrieval Security

This and the following paragraphs describe the security functions for ID/locator mapping records registration and update in the DNR and HNR, as well as for retrieval.

Registration and Update

The DNR records are created and updated by the HNRs in the similar manner as the DNSSEC [RFC 4035] resource records (RRs) are created by DNS UPDATE [RFC 2136] using a TSIG (transactional signature) [RFC 2845] for protecting the message integrity. The HNR records are created or updated by hosts when they attach to an Edge Network by using the procedure described in the next section. Both the DNR and HNR store their records in the format similar to the DNS resource records.

DNR and HNR Records Retrieval Security

Figure 16:
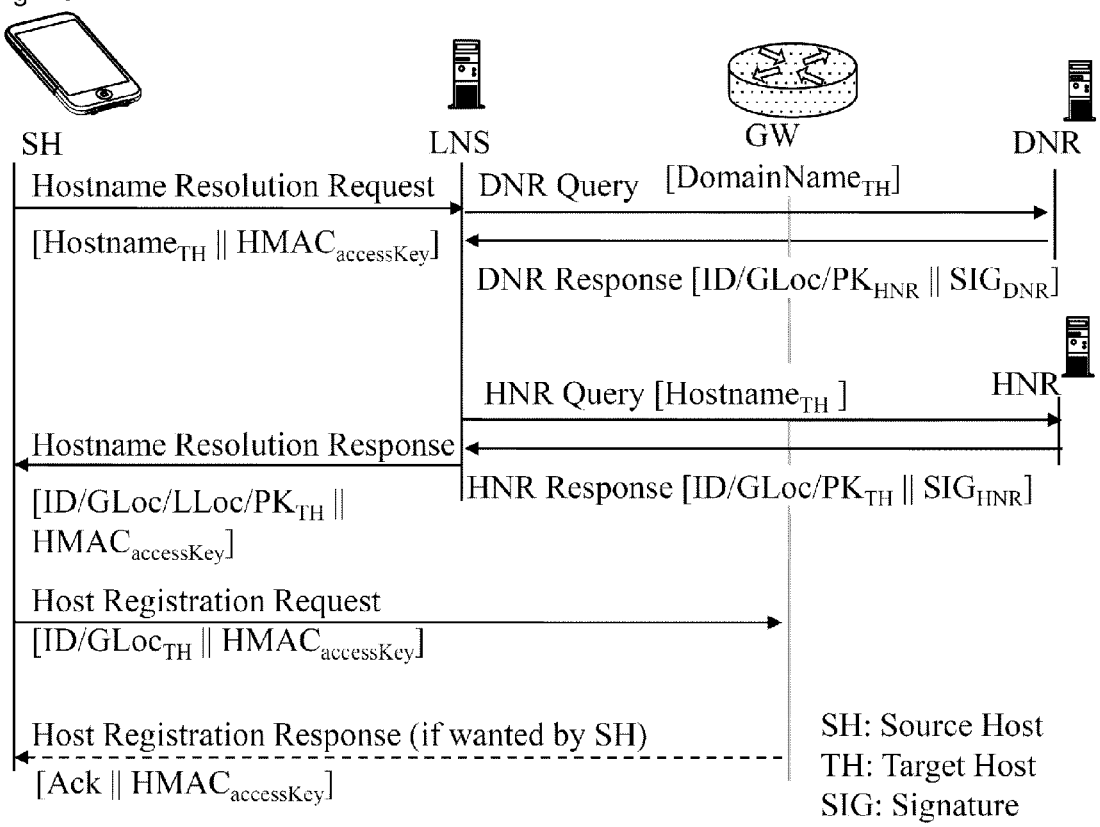
FIG. 16 shows the sequence of messages exchanged for securely retrieving ID/locator mapping.

The HNR records are retrieved by executing the hostname resolution procedure that comprises a sequence of requests (or queries) and responses (or answers) as shown in FIG. 16. The arrows indicate the message flows from one entity to the other and the values inside the square brackets indicates the parameters included in the message. This procedure is initiated by the host (called source host) that wants to know about another host's (called target host) ID, locator, and PK for initiating a session with the latter. For hostname resolution, the source host initially knows only the target host's hostname. The source host sends a hostname resolution request containing the target hostname and receives back a response containing the target host's ID, locator, and PK from the HNR.

The hostname resolution procedure is as follows. The source host sends a hostname resolution request, protected by an HMAC computed using the shared access key, to the LNS (also called the local resolver). The resolver first checks its own record to find if the target host is located in the same Edge Network. If no record is found, it resolves the hostname by first sending a query to the DNR and then another query to the HNR. Both the DNR and HNR query formats are similar to a DNSSEC query. From DNR, the HNR's ID and locators are obtained, while from the HNR the target host's ID, GLoc, and PK, keys and signatures required to verify the authenticity and integrity of these records are obtained. The LNS verifies the authenticity of the RRs using DNSSEC security functions. It may cache the DNR records, but not the HNR records.

The LNS forwards the target host's RRs to the source host in the hostname resolution response message, which is protected by an HMAC. The source host stores the RRs in its security association table (SAT) and finds that the target host is located outside the source Edge Network by checking the target locator parameter field in the message. It then registers the target hostname, ID, and GLoc in the source GW (in case it has many GWs, one of them is selected on the basis of a GW selection algorithm) by sending a host registration message, which is again protected by an HMAC computed using the access key. The GW adds the target host's ID and GLoc to its ID table, and then sends a response (or ack) to the source host if the ack flag "A" was set in the host registration request message. The source host uses the GW's LLoc as the target host's LLoc and, accordingly, sends the outgoing packets to the GW, which searches its ID table to find the target host's GLoc for translating L3 protocol or locators in the packet header.

Alternatively, the LNS can register the target host's information in the source GW, if the source host had preferred this by setting a flag in the hostname resolution request message [by setting flag G=1]. The LNS will use its shared key with the GW to protect the message by an HMAC.

Control Message Format

Figure 17:
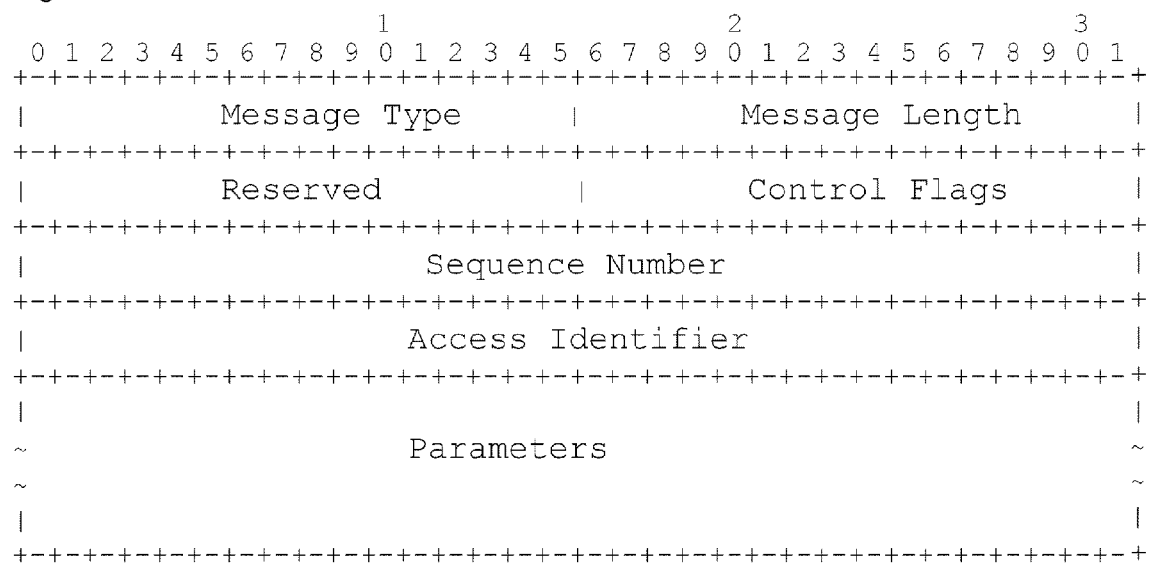
FIG. 17 is an example of host registration control message format.

The header of the control messages exchanged by the host with the access network entries or with HNR is shown in FIG. 17. The basic header is 16 bytes long and composed of six fields: type (2 bytes), length (2 bytes), reserved (2 bytes), control flags (2 bytes), sequence number (4 bytes) and access number (4 bytes). Message Type specifies the type of the message, e.g. 1 for host registration, 2 for peer host registration and 3 for hostname resolution. Message Length specifies the length of the message including both the basic header and parameters. Control Flags specify additional meanings associated with the message. The following flag bits are defined: R (1 for request/0 for response), N (new registration), U (update registration), T (terminate registration), G (registration in GW), S (registration in LNS), H (registration in HNR), A (ack needed), and P (peer host registration). Sequence Number specifies the sequence number of the message and Access Identifier specifies the host's access identifier that the host acquires from the Edge Network at the time of network access (will be explained latter). The combination of the sequence number and access identifier identifies a message uniquely.

The parameters field carries the message content in the form of one or more parameters. For example, the host ID, locator, PK or other information would be included in this field. Parameters are specified in the TLV format, i.e. type (1 bytes), length (1 bytes) and value (variable size).

Network Access Security

Figure 18A:
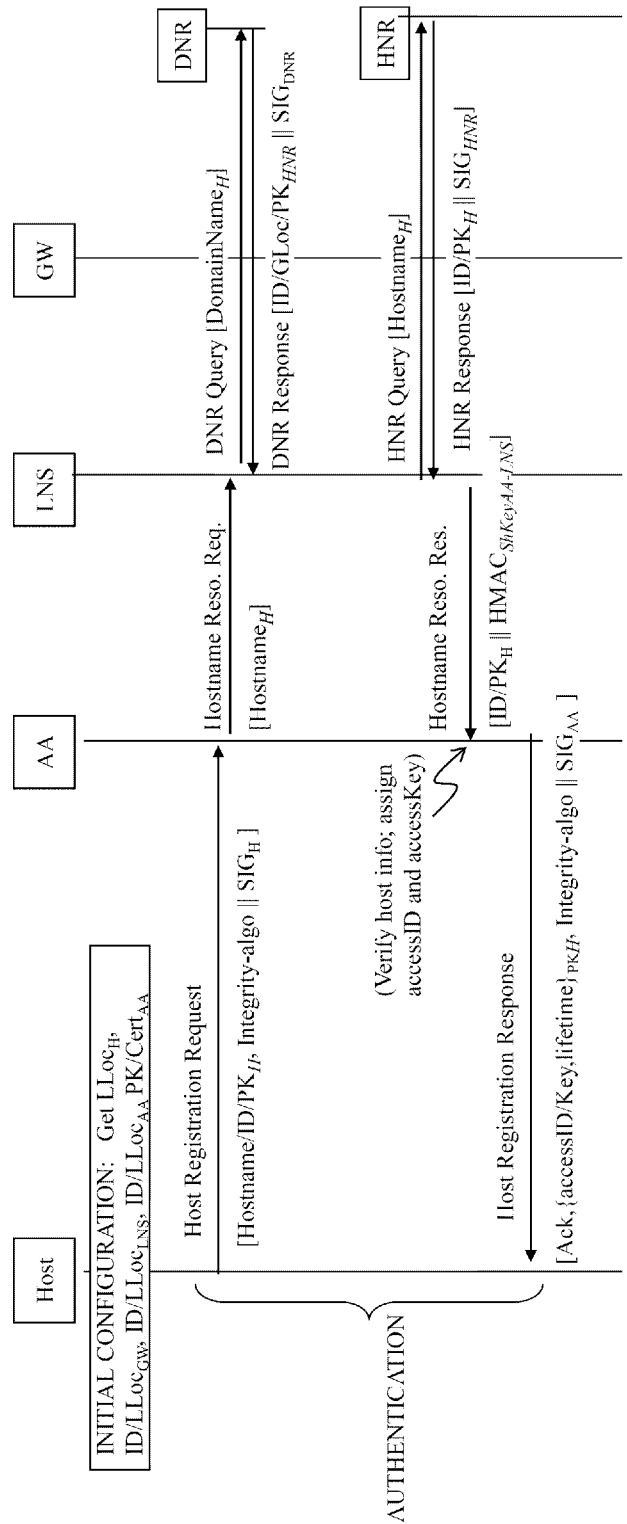
FIG. 18A is a part of sequence of messages exchanged for network access security.
Figure 18B:
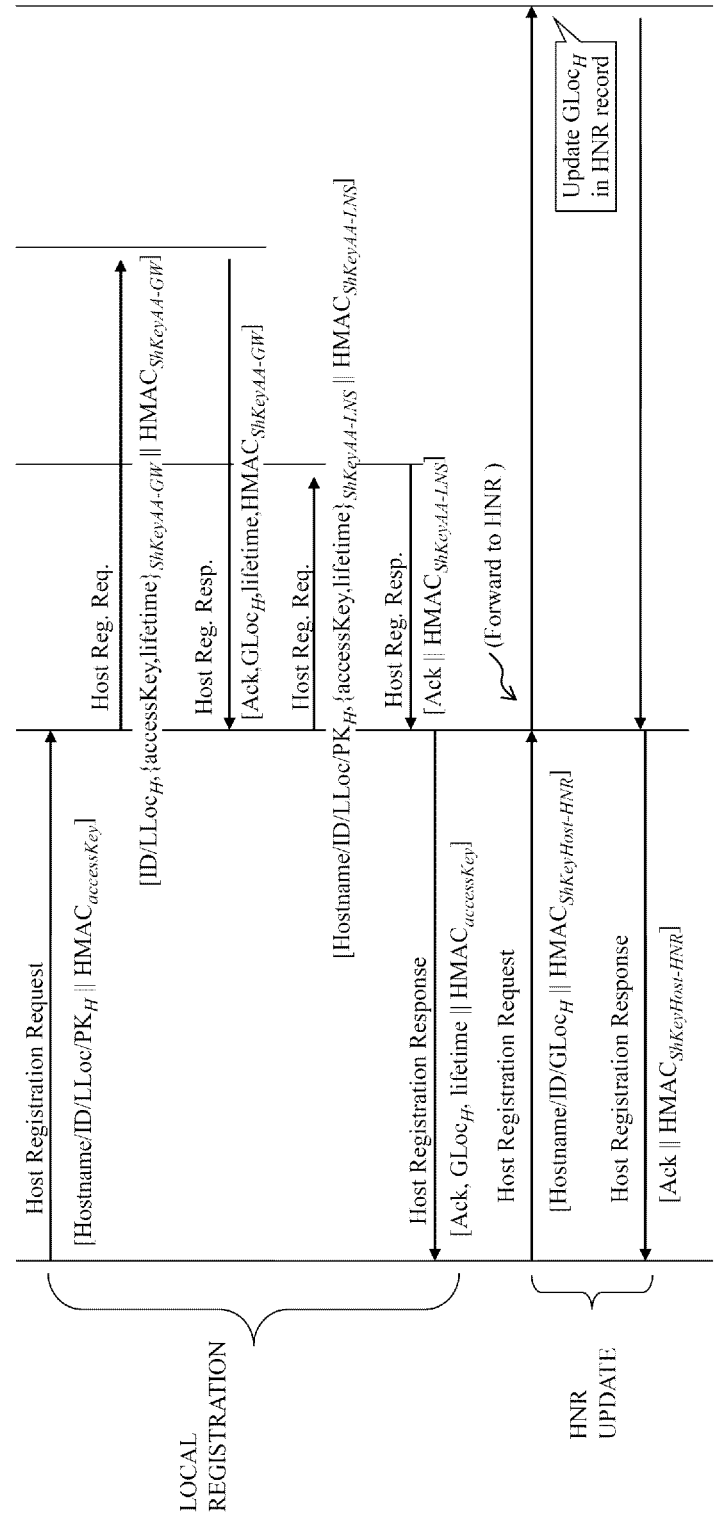
FIG. 18B shows the rest of sequence of messages exchanged for network access security.

Network access security functions are for authenticating hosts and securely registering their information (mainly IDs and locators) in the AA, LNS, GW, and HNR. The host is also provided with an access identifier (accessID) and access key (accessKey), which are used to protect the subsequent signaling messages by including HMACs computed over the message and accessKey. As shown in FIGS. 18A and 18B, the network access procedure consists of four steps: initial configuration, authentication, local registration, and HNR update. Since the AA, LNS, and GW belong to the same trust domain, we assume that they possess pre-shared secret keys, AA-GWshKey, AA-NSshKey, and LNS-GWshKey, which are used to protect messages to be exchanged between them.

When the host detects that an Edge Network is available in its surrounding, it obtains the initial configuration parameters such as its own LLoc as well as IDs and LLocs of AA, LNS, and GW) by executing DHCP or through router advertisements. After getting these parameters, the host enters into the authentication phase by sending a host registration request to AA. The request message includes the global hostname, ID, PK and one or more integrity-check-algorithm types that the host wants use to compute an HMAC for protecting subsequent messages exchanged with the AA, GW, and LNS. After verifying the host identity (by getting host records from the HNR through the hostname resolution procedure as explained earlier), AA selects an appropriate integrity-check-algorithm, which may be HMAC-SHA1. AA also assigns an accessID and a secret accessKey (with definite lifetime) and replies the host with a host registration response message, containing the accessKey encrypted by the host's PK. As stated earlier, the accessKey is used to protect the control messages the host exchanges with the Edge Network entities, i.e, the AA, LNS, and GW.

The host then enters into the local registration phase by sending another host registration request to the AA to have its hostname, ID, PK, and LLoc registered in the LNS and GW. Host's this intension is indicated by setting G and S flags in the message header. Accordingly, the AA registers the host info (including the accessKey) in the GW and LNS by sending host registration messages protected by HMAC computed using secret keys AA-GWshKey and AA-NSshKey, respectively. During this registration the GW also assigns a GLoc (with a definite lifetime) to the host and stores the host info in its ID Table. The GW latter uses the ID table to translate L3 protocols (locators) in packet headers. Similarly, the LNS also stores the host info in the Host Table. The host table is used to resolve the hostname into ID, LLoc, and PK when another host located in the same network wishes to communicate with the former host. After finishing the GW and LNS registration, the AA responds back to the host with a host registration message containing the GLoc. This completes the local registration process.

Once the host has its GLoc it updates its record in the HNR by sending a host registration message (with Flag U=1) via the AA. The message is protected by the shared secret key Host-HNRshKey, which the host had obtained when it registered its info in the HNR for the first time. Completion of the HNR update completes the network access procedure. Now the host is ready for a communication with any other host. Similarly, when the lifetime of the accessKey is about to expire or the host is moving to another access network, the host may renew or terminate its security association with the Edge Network by sending a host registration message (with Flag T=1) to the AA.

Communication Session Security

Communication sessions are secured by including authentication data in the identity header of packets. This scheme assures the packets' origin authentication and integrity. The authentication data are computed by using a security context established during the session initiation phase that follows the hostname resolution process.

Identify Header

Figure 19:
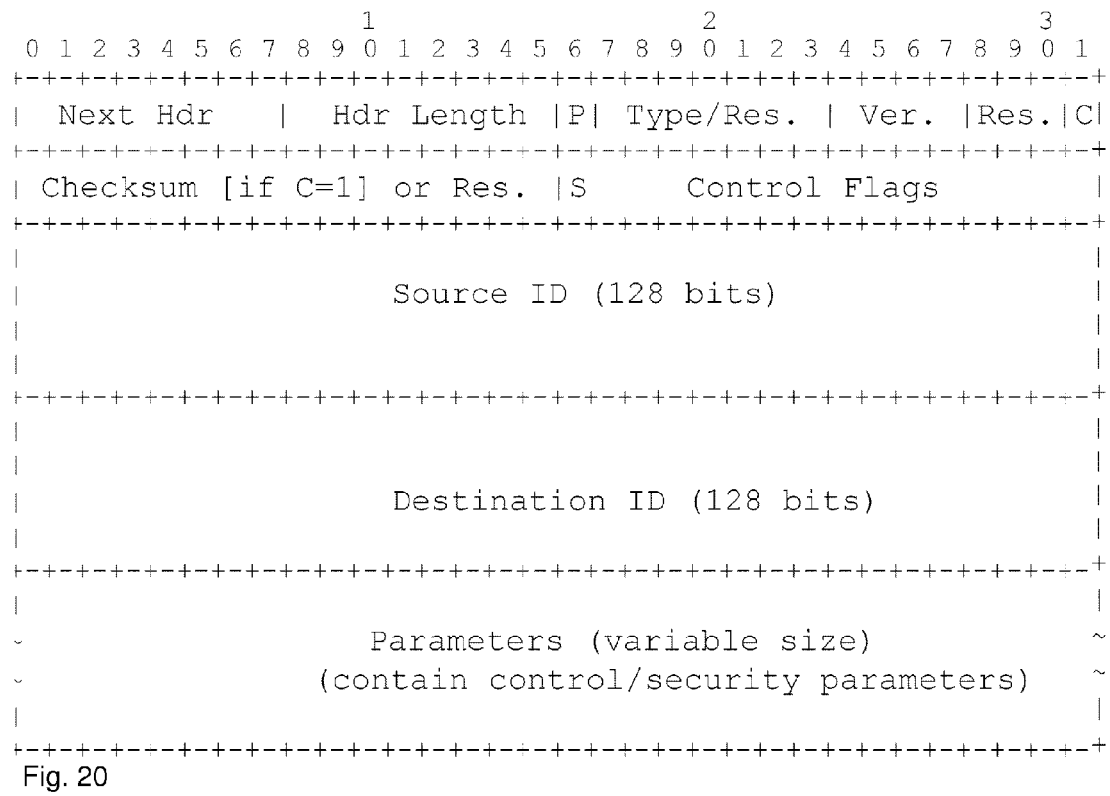
FIG. 19 is an example of ID header format.

The identity layer header format is shown in FIG. 19. The basic header size is 40 bytes long and the variable sized optional parameters field is used to carry authentication data, besides other control messages, e.g. security parameter negotiation messages or mobility signaling messages. The basic header fields are as follows. Next Header (1 byte) specifies the protocol number of the next header in the packet payload (usually transport protocol number); if no payload, Next Header=NO_NXT_HDR (59). Header Length (1 byte) specifies the length of the ID header including optional parameters; P (1 bit) specifies if the packet contains any upper layer payload; Type (7 bits) specifies the ID layer packet type (pType), i.e. type of control message carried in the parameters field; Version (4 bits) specifies the ID layer protocol version, which is 1; C (1 bit) specifies if the ID header has a control message (carried in the parameters field); Checksum (2 bytes) specifies the checksum covering the ID basic header and parameters; Control Flags (2 bytes) specify additional control information such as the nature of IDs and their mapping with locators (persistent/temporal, anonymous, etc.). Flag S is set to 1 to indicate that security functions implemented in the identity layer have been used.

Security Parameters Negotiation

Figure 20:
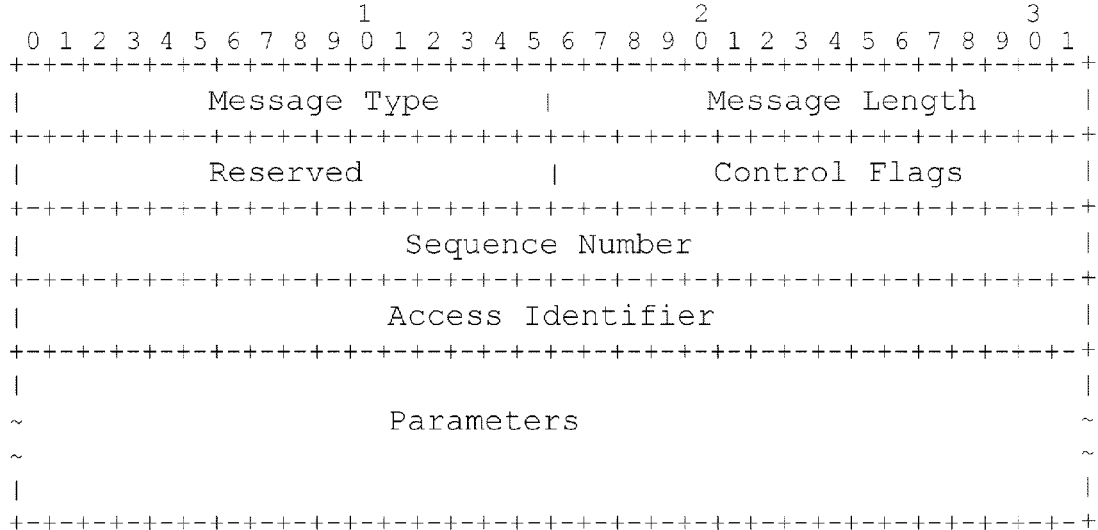
FIG. 20 shows the sequence of messages exchanged in the communication session security procedure.

When an application requires security from the identity layer, the source host (SH) and target host (TH) establish security contexts (such as session secret key and integrity-check-algorithm) by exchanging four control packets from the identity layer as shown in FIG. 20. The SH sends a communication init request message, containing the SH and TH's IDs in the identity header as the source and destination IDs, and SH's hostname, PK, SH and TH's GLocs, and list of integrity-check-algorithm in the parameter fields, and S flag is 1 and pType is 1. In the network layer header, the SH's LLoc and S-GW's LLoc are used in the source and destination locator fields. When the packet reaches the source GW (S-GW), it translates the network layer locators (protocols) to global locators by using its ID table, which contains both the SH and TH's ID/GLoc mappings, obtained during hostname resolution, and forwards the packet to the target GW (T-GW). T-GW again translates the network layer header by consulting its ID table for the TH's ID/LLoc mapping. It uses TH's LLoc in the destination locator and its own LLoc as the source locator in the network header. The packet is then forwarded to the TH. Note that the T-GW's ID table does not yet contain the SH's ID/GLoc mapping. And without this mapping, the TH cannot send a response back to the SH. There are two possible methods for registering SH's ID/GLoc in T-GW: implicit peer host registration or explicit peer host registration. In implicit peer host registration, the T-GW extracts the SH's ID/GLoc from the packet headers and store it in the ID table, while in the explicit registration, the TH has to do peer host registration as shown in the figure.

On receiving the communication init request, the TH stores in a temporary buffer the SH's ID, GLoc, PK and LLoc (i.e. the LLoc of T-GW) as well as the selected integrity-check-algorithm. Then it configures a communication init response 1 message, whose identity header has pType=2, S=1, A=0. The identity header parameters field may contain additional GLocs of TH (if TH has many GLocs). The message is protected by signing the packet with TH's private key. The signature (SIG) is included in the parameters field of the ID header. The packet is then sent to the SH.

The SH generates a secret session key (sessKey) which would be used to protect packets exchanged between the hosts. A lifetime is also associated with sessKey. It then stores the TH's ID, PK, sessKey and lifetime in a temporary buffer. After that it configures a communication init response 2 message including the sessKey encrypted by the TH's PK. The message is signed by the SH's private key and sent to the TH.

To verify SH's identity, TH compares SH's hostname, ID and PK received from SH with similar values retrieved from the SH's HNR by performing a hostname resolution process. If the verification is success, the TH copies the temporary buffer containing SH's parameters to the security association table (SAT). It also adds sessKey received in the communication init response 2 message to the SAT. It then configures a communication init complete message by including the result of session initiation process. The message is protected by including an HMAC computed using sessKey. The communication init complete message is sent to SH.

The SH checks the result parameter in the communication init complete message to know if the TH has accepted the connection request. It may also contain the value of sessKey's lifetime if the TH has altered the value from what the SH has proposed in communication init response 2 message. If the result is OK, the SH copies the temporary buffer that contains the security parameters to its SAT.

Then the source host starts sending data packets whose ID header would contain the packet sequence number and authentication data, which is the HMAC computed over the ID layer protocol data unit (PDU) and sessKey by using the integrity-check-algorithm negotiated during the communication init phase. On receiving these packets, the TH performs the packet's integrity check and origin authentication by referring the SAT for the relevant security context.

Mobility Process Security

The network access security and communication session security functions can be leveraged to secure the mobility process. That is, the security contexts established between the host and network during the network access process and between the hosts during the session initialization process can be used to secure mobility management functions when the host moves from one Edge Network to another. In mobility management, the mobile host (MH) performs the following signaling functions: (a) network access to get new locators from the new Edge Network; (b) updating the old GW with the MH's new GLoc so that the old GW can forward packets to the new GW during handover, (c) updating the peer or correspondent host (CH) and its GW so that the packets will be forwarded to the new location; (d) updating MH's HNR with MH's new GLoc; and (e) disconnecting gracefully from the old Edge Network. Functions (a), (b), (d), and (e) are related with the network access security, and (c) can be performed securely using the security context established for the communication sessions.

INDUSTRIAL APPLICABILITY

This invention can be applied to information and communication technology industry. This invention is very much applicable to mobile and heterogeneous networks where user devices can move from one network to another network while smoothly accessing the network services. The user devices are authenticated and provided secured and optimal connection to the network. For example, a user with a smart mobile phone or laptop computer can remain connected to the network even when he/she is moving from a wireless LAN (wife) network to a WiMAX network to a cellular network. The user can securely select an optimal network, based on application requirements, when all of these three networks are available in the same place.

REFERENCE SIGNS LIST

1 an internet network system,
11 Edge Network, 12 a Source Host (SH), 13 a first gateway (GW), 14 a Local Name Server (LNS), 15 an authentication agent (AA),
21 a Logical Control Network, 22 a domain name registry (DNR), 23 a Host Name Registry (HNR),
31 a Target Host (TH), 32 a second Edge Network, 33 a second gateway (GW), 34 a second Local Name Server (LNS), 35 an authentication agent (AA),
41 a Global Transit Network, 42 Router

CITATION LIST

Patent Literature

[PTL 1]
JP Patent Publication 2008-312191 A

Non Patent Literature

[NPL 1]
[DNS] RFC 1035, Domain names—Implementation and specification, November 1987. http://www.ietforg/rfc/rfc1035.txt
[NPL 2]
[DNSSEC] RFC 4034, Resource Records for the DNS Security Extensions, March 2005. http://www.ietf.org/rfc/rfc4034.txt, R. Moskowitz, P. Nikander, P. Jokela, and T. Henderson, "Host identity protocol," RFC 5201, April 2008.
[NPL 3]
[DNS UPDATE] RFC 2136, Dynamic Updates in the Domain Name System (DNS UPDATE), April 1997. http://www.ietf.org/rfc/rfc2136.txt
[NPL 4]
[TSIG] RFC 2845, Secret Key Transaction Authentication for DNS (TSIG), May 2000. http://www.ietf.org/rfc/rfc2845.txt
[NPL 5]
[IPsec] RFC 4301, Security Architecture for the Internet Protocol, December 2005. http://www.ietf.org/rfc/rfc4301.txt
[NPL 6]
[HIP] RFC 5201, Host Identity Protocol, April 2008. http://www.ietf.org/rfc/rfc5201.txt

[NPL 7]
[HIMALIS] HIMALIS: Heterogeneity Inclusion and Mobility Adaptation through Locator ID Separation in New Generation Network, IEICE Transaction on Communications, Vol. E93-B, No. 3, pp. 478-489, March 2010.
[NPL 8]
[DHCP] RFC 2131, Dynamic Host Configuration Protocol, March 1997. http://www.ietf.org/rfc/rfc2131.txt
[NPL 9]
[LIPS] D. Farinacci, V. Fuller, D. Meyer, and D. Lewis, "Locator/ID separation protocol (LISP)," Internet-Draft, http://www.ietf.org/id/draft-ietf-lisp-16.txt, October 2011.
[NPL 10]
[Shim6] E. Nordmark and M. Bagnulo, "Shim6: Level 3 multihoming shim protocol for IPv6," RFC 5533, June 2009.
[NPL 11] [HIMALIS] V. P. Kafle and M. Inoue, "HIMALIS: Heterogeneity inclusion and mobility adaptation through locator ID separation in new generation network," IEICE Trans. Commun., vol. E93-B, no. 3, March 2010.
[NPL 12]
[DNS2] V. P. Kafle, H. Otsuki, and M. Inoue, "An ID/locator split architecture for future networks," IEEE Commun. Mag., vol. 48, no. 2, February 2010.
[NPL 13]
[ALT] V. Fuller, D. Farinacci, D. Meyer, and D. Lewis, "LISP alternate toplogy (LISP+ALT)," Internet-Draft, IETF, September 2011.

The invention claimed is:

1. A method for a hostname resolution in an internet network system
wherein the system comprises:
a first Edge Network that comprises a Source Host (SH), a first gateway (GW) and a Local Name Server (LNS);
a Logical Control network which comprises a Domain Name Registry (DNR) and a Host Name Registry (HNR);
a Target Host (TH) in the first Edge Network or in a second Edge Network; and
a Global Transit Network which includes Routers to connect the first Edge Network, the Logical Control network; and the second Edge Network,
wherein the method comprises:
the SH, which knows a hostname of the TH, sends a hostname resolution query, which includes the hostname of the TH, to the LNS so as to obtain any one or more of the TH's ID, the TH's locator and the TH's Public Key (PK),
the LNS receives the hostname resolution query and checks whether the TH is in the first Edge Network or not,
when the LNS cannot decide that the TH is located in the first Edge Network, the LNS sends a first query, which includes the hostname of the TH, to the DNR,
the DNR receives the first query and then the DNR sends a first reply to the LNS, wherein the first reply contains the HNR's information including the HNR's ID, the HNR's locator, and the HNR's Public Key,
the LNS receives the first reply and then the LNS sends a second query to the HNR using the HNR's information, wherein the second query requests the HNR to provide LNS with the TH's ID, the TH's locator and the TH's PK,
the HNR receives the second query and then the HNR sends a second reply to the LNS, wherein the second reply contains the TH's ID, the TH's locator and the TH's PK, the LNS receives the second reply and executes a function to verify the authenticity of the second reply by using the HNR's PK, when the result of the verification is OK, the LNS sends a hostname resolution response, which includes the TH's ID, the TH's locator and the TH's Public Key (PK), to the SH, the SH receives the TH's ID, the TH's locator and the TH's PK in the hostname resolution response.

2. A method in accordance with claim 1, wherein the first reply further comprises the DNR's PK and the DNR's Signature using the DNR's private key, and the DNR's PK and the DNR's Signature are used in verifying the first reply from the DNR.

3. A method in accordance with claim 1, wherein the first Edge Network further comprises: an authentication agent (AA) and a Dynamic Host Configuration Protocol Server (DHCP), wherein the first gateway (GW), the LNS and the AA have pair-wise shared keys, AA-GWshKey, AA-LNSshKey and LNS-GWshKey, that are used to protect messages to be exchanged between them, the method further comprises, before the SH sends a hostname resolution query, an initial configuration step for obtaining the SH's own LLoc and the first GW's ID and LLoc, the LNS's ID and LLoc and the AA's ID and LLoc from the DHCP, an authentication step for authenticating the SH in the first Edge Network, a local registration step for making the SH's hostname, ID, PK and LLoc registered in the first GW and in the LNS, and an HNR update step for updating the SH's locator in the HNR, wherein in the authentication step, which occurs after the initial configuration step, the SH sends a first host registration request to the AA, wherein the first host registration request includes the SH's hostname, the SH's ID, the SH's PK and a list of integrity-check-algorithm supported by the SH, the AA receives the first host registration request and after that the AA performs the hostname resolution in accordance with claim 1 to get the SH's ID and PK from the HNR as well, the AA verifies that the host information sent by the SH and that obtained from the HNR are the same, the AA selects an integrity-check-algorithm based on the type of integrity-check-algorithm the AA can support, the AA assigns an Access ID and a secret Access Key, the AA sends a first host registration reply, which includes the integrity-check-algorithm, the Access ID and the secret Access Key, to the SH, wherein the Access ID and the secret Access Key are encrypted by the SH's PK, and the SH receives the first host registration reply, wherein in the local registration step, which occurs after the authentication step, the SH sends a second host registration request, which includes the SH's hostname, the SH's ID, the SH's LLoc, the SH's PK, which is integrity protected by including an HMAC computed by using the Access Key in the integrity-check-algorithm, to the AA, the AA receives the second host registration request, the AA sends a host registration message for GW, which includes the SH's hostname, the SH's ID, the SH's LLoc, the SH's PK and Access Key encrypted by AA-GWshKey, to the first GW and the AA sends a host registration message for LNS, which includes the SH's hostname, the SH's ID, the SH's LLoc, the SH's PK and Access Key encrypted by AA-LNSshKey, to the LNS, the first GW receives and decrypts the host registration message for GW using AA-GWshKey, the first GW assigns a GLoc to the SH and stores the SH's GLoc in the memory of the first GW, the first GW sends a host registration response message from GW, which includes the SH's GLoc, to the AA, the LNS receives and reads the host registration message for LNS using AA-LNSshKey and the LNS stores the SH's hostname, the SH's ID, the SH's LLoc, the SH's PK and Access Key, the LNS sends a host registration response message from LNS to the AA, the AA sends a second host registration reply, which comprises the SH's GLoc, to the SH, and the SH receives the second host registration reply, wherein in the HNR update step, which is executed after the local registration step, the SH sends a third host registration request, which includes the SH's hostname, the SH's ID and the SH's GLoc and encrypted by SH-HNRshKey, to the HNR, the HNR receives and reads the third host registration request using the SH-HNRshKey, and the HNR updates the SH's GLoc in the HNR's record and sends a third host registration response to the SH.

4. A method in accordance with claim 1, further comprising a procedure for establishing a communication session between the SH and the TH:

the SH sends a first communication init request message, containing the SH and TH's IDs, SH's hostname, PK and GLoc, TH's GLoc, list of integrity-check-algorithms, and SH's signature to the TH so as to tell a communication request to the TH, the TH receives the first communication init request message and stores, in a temporary buffer of the TH, the SH's ID, GLoc, PK and LLoc and the selected integrity-check-algorithm, the TH verifies the authenticity of the SH by retrieving the SH's ID and PK from the HNR by performing a hostname resolution process in accordance with claim 1, the TH sends a first communication init response that includes the TH's GLocs when the TH has two or more GLocs, to the SH, the first communication init response being protected by TH's signature using its private key, the SH receives the first communication init response and generates a secret session key (sessKey) which is used to protect the integrity of packets exchanged between the SH and the TH, a lifetime being associated with the sessKey, the SH stores the TH's ID, PK, sessKey and lifetime in a temporary buffer of the SH, the SH sends a second communication init response, which includes the sessKey encrypted by the TH's PK, and the message signed by the SH's private key, to the TH, the TH receives the second communication init response and copies the temporary buffer, which contains the SH's ID, GLoc, PK and LLoc, and the sessKey to the security association table (SAT) of the TH, the TH sends a communication init complete message, which is protected by an HMAC computed using the sessKey, to the SH, the SH receives and checks the communication init complete message to confirm whether the TH has accepted the connection request or not, the SH copies the temporary buffer that contains the SH's ID, GLoc, PK and LLoc to the SAT of the SH, and the SH starts sending or receiving data to or from the TH.

* * * * *